US009961377B1

(12) United States Patent
Miner et al.

(10) Patent No.: US 9,961,377 B1
(45) Date of Patent: May 1, 2018

(54) SYSTEMS AND METHODS FOR PROVIDING ADVERTISEMENTS TO POINT OF PRESENCE DEVICES INCLUDING MAPPING DIFFERENT TYPES OF ADVERTISEMENT MESSAGES OF RESPECTIVE CONTENT PROVIDERS

(71) Applicant: The DIRECTV Group, Inc., El Segundo, CA (US)

(72) Inventors: Daniel M. Miner, Redondo Beach, CA (US); Matthew Pinto, Big Bear City, CA (US); Roberto Nery Da Fonseca, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days. days.

(21) Appl. No.: 14/880,871

(22) Filed: Oct. 12, 2015

(51) Int. Cl.
| | |
|---|---|
| *H04N 7/10* | (2006.01) |
| *H04N 21/234* | (2011.01) |
| *G11B 27/036* | (2006.01) |
| *H04N 21/81* | (2011.01) |
| *H04N 21/61* | (2011.01) |
| *H04N 21/262* | (2011.01) |

(52) U.S. Cl.
CPC ..... *H04N 21/23424* (2013.01); *G11B 27/036* (2013.01); *H04N 21/262* (2013.01); *H04N 21/6143* (2013.01); *H04N 21/812* (2013.01)

(58) Field of Classification Search
CPC .......... H04N 21/812; H04N 21/23424; H04N 21/262; H04N 21/6143; G11B 27/036
USPC ....................................................... 725/32
See application file for complete search history.

(56) References Cited

U.S. PATENT DOCUMENTS

| 2009/0070837 A1* | 3/2009 | Jacobs | G06Q 20/3678 |
| | | | 725/104 |
| 2009/0217318 A1* | 8/2009 | VerSteeg | G06Q 30/02 |
| | | | 725/32 |

(Continued)

OTHER PUBLICATIONS

Society of Cable Telecommunications Engineers, SCTE 35 2014 Digital Program Insertion Cueing Message for Cable, 2014, p. 1-67.*

*Primary Examiner* — Nathan Flynn
*Assistant Examiner* — Alfonso Castro
(74) *Attorney, Agent, or Firm* — Harness, Dickey & Pierce

(57) ABSTRACT

A content distribution method including receiving in-band signals from respective content providers, where the in-band signals include video content. The method further includes: receiving at a placement opportunities information module first messages associated respectively with the content providers, where the first messages are advertisement messages and/or program messages and have respective formats; and mapping the first messages to second messages, where the second messages have a same format, and where the same format is different than the respective formats and is standardized for point of presence devices. The method further includes: combining the second messages with the video content to generate combined signals; forwarding the combined signals to an insertion module of a headend; generating output signals at the insertion module based on the combined signals; and for each of the output signals, transmitting a non-streaming signal or a streaming signal from the headend to the point of presence devices.

22 Claims, 8 Drawing Sheets

(56) References Cited

U.S. PATENT DOCUMENTS

| | | | |
|---|---|---|---|
| 2010/0043022 A1* | 2/2010 | Kaftan | G06Q 30/02 725/34 |
| 2013/0332971 A1* | 12/2013 | Fisher | H04N 21/266 725/93 |
| 2014/0020013 A1* | 1/2014 | DiLorenzo | H04N 21/812 725/32 |

* cited by examiner

SYSTEMS AND METHODS FOR PROVIDING ADVERTISEMENTS TO POINT OF PRESENCE DEVICES INCLUDING MAPPING DIFFERENT TYPES OF ADVERTISEMENT MESSAGES OF RESPECTIVE CONTENT PROVIDERS

TECHNOLOGY FIELD

The present disclosure relates generally to content distribution systems and, more specifically, to systems and methods for providing non-targeted advertisements (ADs) and targeted ADs to point of presence (POP) devices.

BACKGROUND

The statements in this section merely provide background information related to the present disclosure and may not constitute prior art.

Satellite television has become increasingly popular due to a wide variety of content and the quality of content available. A satellite television system typically includes a set top box and/or other POP devices that are used to receive satellite signals and decode the satellite signals for use on a television. The POP devices typically have memory associated therewith. The memory may include a digital video recorder or the like as well as storage for an operating code.

Content providers and/or service providers may provide a variety of content to POP devices of customers. The content may be broadcasted via wireless and/or wired networks to the service providers and/or POP devices. The content may be provided in the form of audio, video, movies, advertisements (ADs), etc. Available content is typically received at a set top box (or user receiving device) and displayed to the user using a guide. The guide typically includes channels and timeslots as well as programming information for each information timeslot. The programming information may include the content title and other identifiers such as actor information and the like. The user selects a channel via the guide and the set top box (STB) then displays the channel on a display (e.g., a television).

Customers (or users) of a service provider can subscribe to various packages. Each of the packages provides access to a certain set of channels. The customers contact the service provider to establish an account with the service provider. While setting up an account, a customer selects a package and provides billing information to the service provider. The customer is then able to access channels in the selected package.

In addition to the channels in a selected package that a customer is signed up to receive, the customer may also receive additional content. This may include the customer selecting a channel, program and/or video via the STB or other POP device and/or contacting the service provider to request for the selected channel, program and/or video. For example, a customer may request a video, obtain authorization to receive the video, and receive the video at a STB of the customer. This is often referred to as pay-per-view (PPV) or video-on-demand (VOD). The video may be transmitted to the STB and then displayed on a display (or television) of the STB. The customer may control when the video is displayed.

Programs, PPV videos, VOD videos, and/or other content may be interrupted to display ADs. The broadcast industry is beginning to use Society of Cable Telecommunications Engineers (SCTE)-35 messages, defined in the American National Standards Institute (ANSI) 2014 SCTE-35 standard, to carry a variety of program related types of information for ADs. The information includes cueing start, duration, and end of advertisement opportunities and additional information. The SCTE-35 messages also include, for example, signaling of beginning and end of chapters, segments and programs, as well as signaling of content that cannot be streamed over the Internet.

SUMMARY

The present disclosure provides systems and methods for providing content access based on quick response codes and text messages.

In one aspect of the disclosure, a content distribution method is provided and includes receiving in-band signals from respective content providers, where the in-band signals include video content. The method further includes: receiving at a placement opportunities information module first messages associated respectively with the content providers, where the first messages are advertisement messages and/or program messages and have respective formats; and mapping the first messages to second messages, where the second messages have a same format, and where the same format is different than the respective formats of the first messages and is standardized for point of presence devices. The method further includes: combining the second messages with the video content to generate combined signals; forwarding the combined signals to one or more insertion modules of a headend; generating output signals at the one or more insertion modules based on the combined signals; and for each of the output signals, transmitting a non-streaming signal or a streaming signal from the headend to the point of presence devices.

In another aspect, a content distribution system is provided and includes a headend, placement opportunities information module, a combiner and one or more insertion modules. The headend is configured to receive in-band signals from respective content providers. The in-band signals include video content. The placement opportunities information module is configured to receive first messages associated respectively with the content providers. The first messages have respective formats. The placement opportunities information module is configured to map the first messages to second messages. The second messages have a same format. The same format is different than the respective formats of the first messages and is standardized for point of presence devices. The combiner is configured to combine the second messages with the video content to generate combined signals. The one or more insertion modules are configured to receive the combined signals from the combiner and generate output signals based on the combined signals. The headend is configured to, for each of the output signals, transmit a non-streaming signal or a streaming signal to the plurality of point of presence devices.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
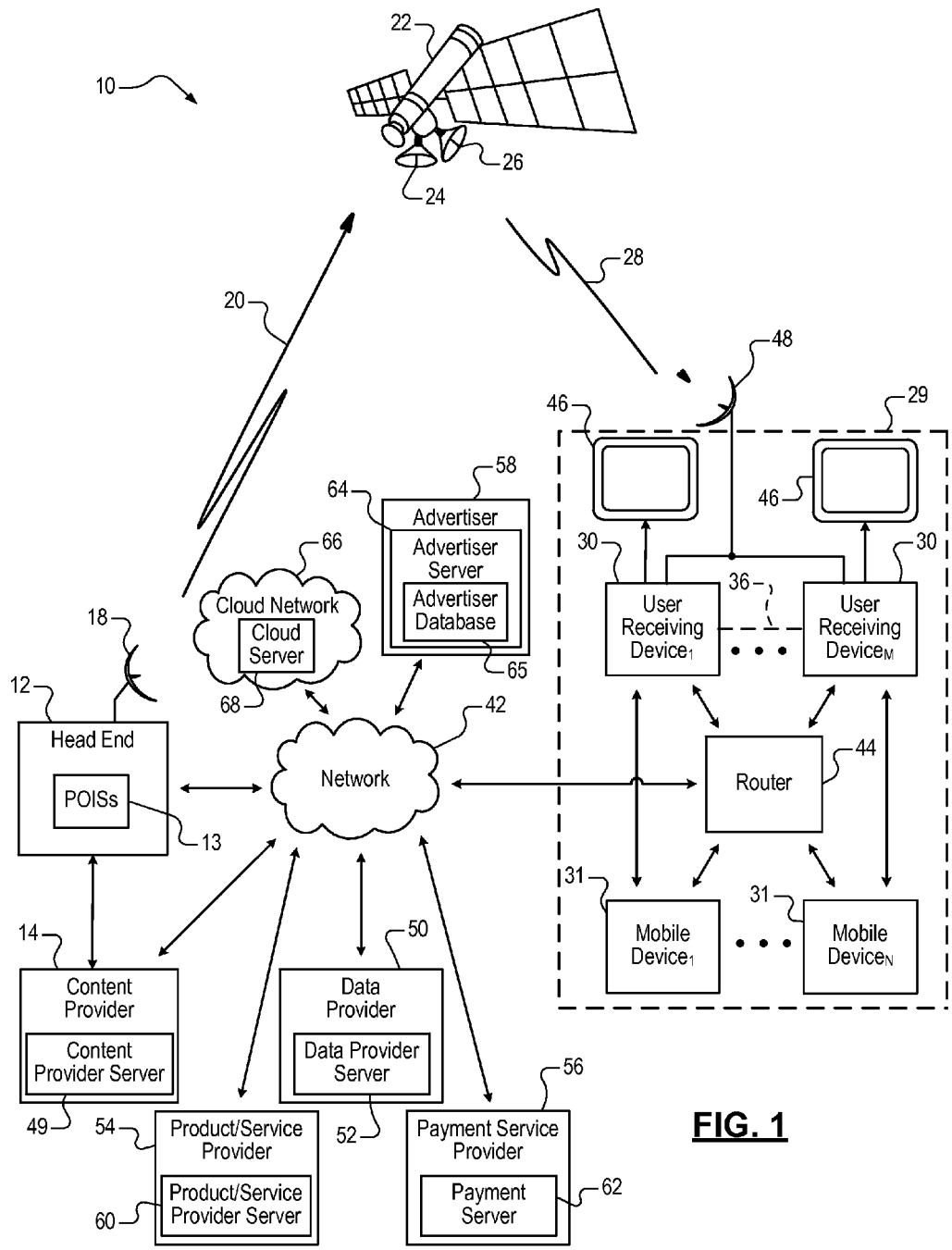
FIG. 1 is a functional block diagram of a communication system in accordance with the present disclosure.

A set-top-box (STB) may receive an audio/video input signal via a cable network or a satellite and direct the audio-video input to a television (or other display). A user may interact with the STB via a remote control device, a cellular phone or other mobile device in order to view a guide and/or programs on the television and manage usage of the STB. The terms "user", "viewer", and "customer" are used herein interchangeably and may refer to the same person. Transactions between the user and a service provider may be performed via the STB, the mobile device and/or other point of presence (POP) device. The transactions may be associated with services/content being provided by the service provider to the POP devices. The services/content may include, for example, programs, audio tracks, videos, and/or pay-per-view (PPV) products. Various types of products (or content) may be offered including (i) pay-to-rent content such as video-on-demand (VOD) content (e.g., standard definition (SD), high-definition (HD) and/or 4K (referred to sometimes as ultra-high definition) formats), and (ii) pay-to-own content such as electronic sell through (EST) content (e.g., SD, HD and/or 4K formats). The content may include: pay-to-own content such as movies and television shows; permanent viewing access rights to content, where unlimited viewing time has been paid by a customer; pay-to-rent content, such as movies and TV shows, where a finite duration of viewing access rights to content is provided and a limited viewing time is paid for by a customer; and/or subscription of on-demand content, where a customer has viewing access to a library or collection of content for a recurring fee.

Broadband content may be delivered to POP devices, such as consumer devices, mobile devices (e.g., laptop computers, smart telephones, and tablets), URDs, set-top-boxes (STBs) media gateway devices, personal computers, smart televisions, etc. A POP center refers to a network operation center or data center that may be located in various geographical locations. POP devices of a customer may be located in one or more rooms, floors, buildings and/or geographical locations.

As an example, the headends, content providers, and service providers may provide various types of content including programs, videos, and PPV content. Advertisements (ADs) may be inserted in the provided content and shown and/or played out during play-out of the provided content. Content providers and/or advertisers may use the ADs to advertise products (e.g., consumer products), services (e.g., residential or business services, legal services, medical services, etc.), programs (e.g., broadcast channels, concerts, sporting events, etc.), videos, PPV content (e.g., videos, sporting events, etc.), and/or other items that can be advertised. The products may include the programs, videos, PPV content, and/or other content. The consumer products may include food and/or drink products, residential products, business products, vehicles, and/or other products. The advertisements may advertise content provided by a content provider and/or products and services offered for purchase by other product and/or service providers. The ADs may be targeted advertisements for certain POP devices, customers, groups of customers, geographical areas, networks, etc. or may be broadcast and not targeted to certain POP devices, customers, groups of customers, geographical areas, networks, etc. The advertisements may be global or local based advertisements and may be inserted in various types of content at allocated and/or predetermined points in time. The advertisements may be streamed.

Content providers and/or advertisers may provide messages (e.g., SCTE-35 messages) to service providers to indicate various information regarding programs and ADs to be played-out, displayed and/or blocked from being played-out. The messages may be program messages or AD messages. The program messages may request and/or indicated when programs are to be played-out, blocked out, and/or a slate is to be raised. The AD messages request when the ADs are to be played out and/or displayed on POP devices. The programs and/or ADs may be provided separate from the program messages and the AD messages and stored at the service provider and/or at POP devices. The program messages and the AD messages are customized to the content providers, such that different types of program messages and AD messages are generated by respective content providers. Although the program messages and/or the AD messages may be generated according to and/or to satisfy a same standard (e.g., the SCTE-35 standard), the program messages and/or the AD messages may have different configurations, syntax, codes, formats and/or information.

An AD message may be received at an information technology extended (iTX) system and processed prior to being sent to the POP devices. The iTX system is an automation and scheduling system and may, for example, modify a field (e.g., a splice event identifier field) of the AD message to indicate that a request to playout an AD fits within a current program schedule. A break descriptor server, based on the modified field, may insert a break descriptor in the SCTE-35 message or provides a SCTE-35 message with a unique break descriptor identifier indicating to the POP device when to insert the AD. Service providers, headends, and/or POP devices can be complex and require a large amount of memory and processing power to decipher the different types of AD messages.

The following disclosed examples provide placement opportunities information systems (POISs) and corresponding placement opportunities information modules (POIMs) for mapping advertisement messages into a same or standardized format (referred to as the "in-house format") that is recognizable to service provider distribution systems and modules and POP devices. This decreases operating complexity, memory and processing power requirements, and development time of (i) service provider systems, equipment and/or modules downstream of the POIMs, and (ii) POP devices. The POIMs provide single points upstream from POPs for processing and parsing program messages and/or AD messages.

FIG. 1 shows a communication system 10 that includes a headend 12. The headend 12 operates as a content processing system and a transmission source. The headend 12 may also be used for distributing content and providing billing data. The headend 12 includes POISs 13, which map messages (program and/or AD messages) into the in-house format. The mapping is further described with respect to FIGS. 6-8. Some details of the headend 12 are described below with respect to FIG. 2. Although a single headend is shown, multiple headends may be incorporated in the communication system 10. The program and/or AD messages may be SCTE-35 messages. The AD messages may be used to indicate AD insertion via splice insert (splice_insert( )) commands. The below described examples include autonomously and accurately triggering requested events and continued support of targeted AD insertion. Automated insertion of slates when programs are not allowed to be streamed (referred to as blackouts) is also disclosed. Slates are further described below. Program boundary indicators are provided for delayed playback.

One or more content providers 14, only one of which is illustrated in FIG. 1, may provide content and data related to the content such as metadata to the headend 12. The content providers 14 may individually and/or collectively be referred to as a content service provider. The content may include channels, programs, videos and/or other content. The metadata may include ratings data. Ratings data may include Motion Picture Association ratings such as G, PG, PG-13, R, NC-17 and X. Ratings data may also include television ratings such as TV-Y, TV-Y7, TV-G, TV-PG, TV-14, and TV-MA. Of course, different countries may have different rating systems. The headend 12 receives various types of content and data from the content provider 14 and communicates the content to various user devices associated with the system.

The headend 12 may communicate content to users in various manners including a satellite system and through terrestrial networks. Carrying through with the satellite example, the headend 12 includes an antenna 18 for communicating process content through uplink signals 20 to a satellite 22. The satellite 22 may include a receiving antenna 24 and a transmitting antenna 26. The receiving antenna 24 receives the uplink signals 20 from the satellite antenna 18. The transmitting antenna 26 generates downlink signals 28 and communicates the downlink signals 28 to various POP devices, such as user receiving devices 30 and/or mobile devices 31. The user receiving devices 30 may be implemented as and/or include set top boxes.

The headend 12 may be connected to the user receiving devices 30 via the network 42 and/or the router 44. The network 42 may be a single network or a combination of different types of networks. For example, the network 42 may be a broadband wired network, a digital subscriber line (DSL) network, and/or a wireless network. A broadband wired network may be an Ethernet network or a phone line network. The network 42 may be a one-way network such that data may be communicated from the user receiving devices 30 to the headend 12. The network 42 may also be a two-way network that delivers content from the headend 12 in response to selection signals communicated from the user receiving devices 30. The network 42 may be in communication with the local area network 36. The network 42 may include an Internet.

The user receiving devices 30 may include and/or be connected to displays 46 (e.g., televisions), as shown. The displays 46 may display both video signals and output audio signals. The user receiving devices 30 may be referred to as fixed (or non-mobile) user devices because the user receiving devices are intended to be used from a fixed position on the surface of the earth. The user receiving devices 30 may include circuitry to tune, decode and store content therein. Details of the user receiving devices 30 are further described below.

The user receiving devices 30 may be in communication with each other through a network 36 such as a local area network. Content may be stored in one or more of the user receiving devices 30 and/or in a memory separate from the user receiving devices 30 and accessed by the user receiving devices 30. The content may be shared by and/or transmitted between the user receiving devices 30. The user receiving devices 30 may be located in respective rooms of a building (an example of which is designated 29), such as a home, multi-unit dwelling or business. The content may be delivered to two or more of the user receiving devices 30 during a same period of time in a multi-room viewing function. The user receiving devices 30 may be associated with one or more accounts.

The user receiving devices 30 are in communication with an antenna 48. The antenna 48 receives the downlink signals 28. Thus, the user receiving devices 30 may be referred to as satellite television receiving devices. However, the system has applicability in non-satellite applications, such as in wired or wireless terrestrial systems. The user receiving devices 30 may be included in and/or implemented as televisions, set top boxes, and/or set back boxes and thus may be referred to as fixed (or non-mobile devices). The user receiving devices 30 may be referred to as televisions, set top boxes, and/or set back boxes. The user receiving devices 30 may be interconnected.

The user receiving devices 30 may be connected to the router 44 and/or may be in communication with the network 42 and the mobile devices 31. The mobile devices 31 may be cellular phones, smart phones (i.e. have Internet access), dumb phones (i.e. do not have Internet access), tablets, laptops, wearable device, etc. A wearable device may be one of a number of types of devices that are worn by a user. A wearable device may be fixed wearable by a user meaning the wearable device is meant to be fixed to the user. Examples of wearable devices include a computerized watch such as a Samsung® or Apple® watch. The watch devices are fixed to an arm of the user. Another example of a wearable device is GOOGLE GLASS®, which is fixed to a head of a user. Of course, other types of wearable devices affixed to other parts of the body may be used. A wearable device may be in direct communication with the user receiving devices 30 through Bluetooth® connections. As described below, the user receiving devices 30 and the mobile devices 31 may include Bluetooth® transceivers (referred to as radios). The mobile devices 31 may also be in communication with the user receiving devices 30 via Internet protocol (IP) connections and/or the router 44. The mobile devices 31 may also be in communication with devices (e.g., the headend 12) outside the local area network via the router 44 and/or the network 42. As used herein, a mobile device may refer to a mobile phone, a tablet, a remote control device, a wearable device, etc.

The router 44 may be a wireless router or a wired router or a combination of the two. For example, the user receiving devices 30 may be wired to the router 44 and wirelessly coupled to the mobile devices 31. The router 44 may communicate IP signals to the user receiving devices 30. The IP signals may be used for controlling various functions of the user receiving devices 30. IP signals may also originate from the user receiving devices 30 and be transmitted to the mobile device 31.

Figure 5:
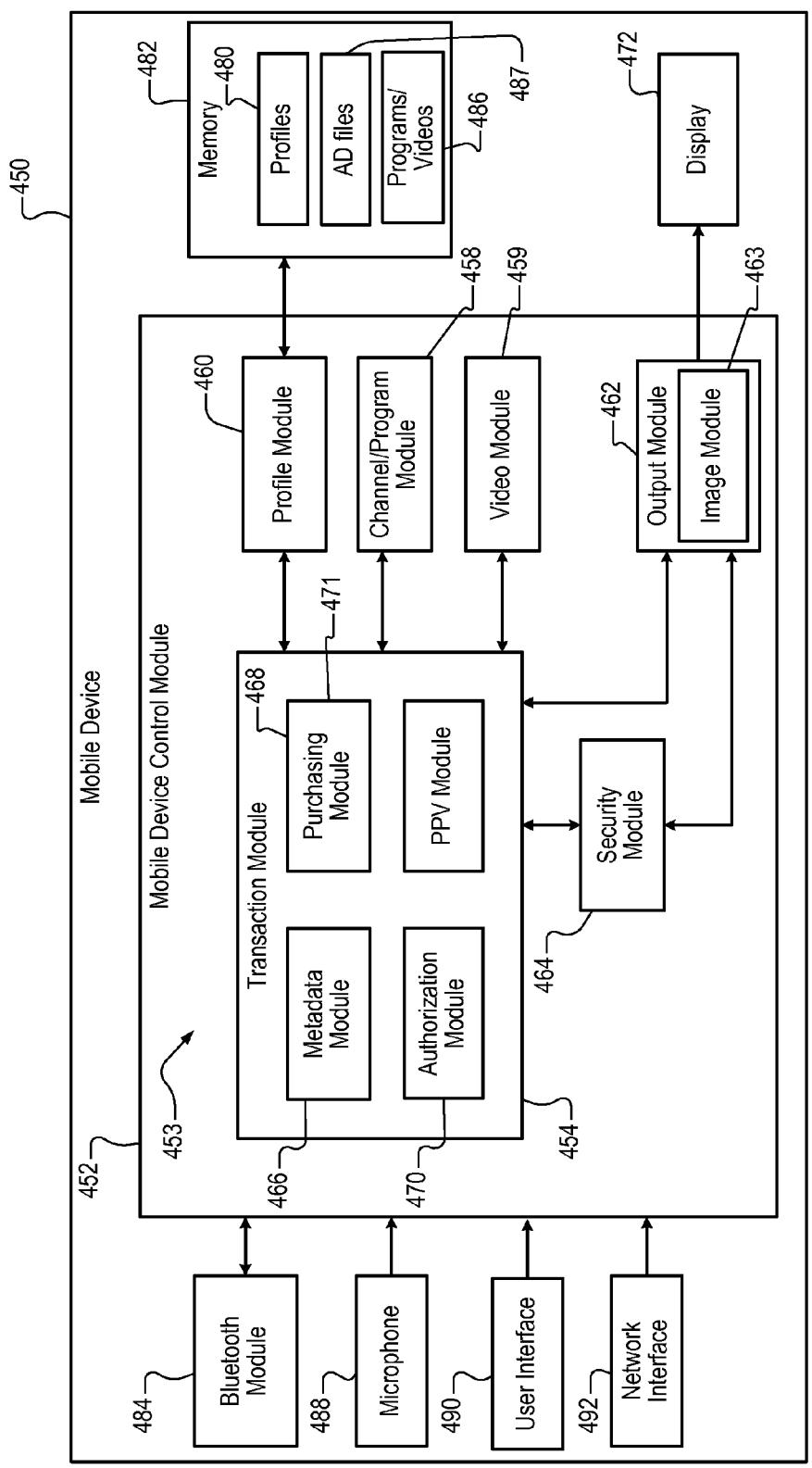
FIG. 5 is a functional block diagram of a mobile device in accordance with the present disclosure.

The mobile devices 31 may also have displays, an example of which is shown in FIG. 5. The displays of the mobile devices 31 may display video and output audio signals. The displays may be touch screens that act as user interfaces. Other types of user interfaces on the mobile devices 31 may include buttons and switches.

The network 42 may, for example, be a public switched telephone network, the Internet, a mobile telephone network or other type of network. The network 42 may be in direct wireless communication with the mobile device 31 via a cellular system and/or may be in indirect communication with the mobile devices 31 via the router 44 and/or the user receiving devices 30.

The content provider 14 provides content to the headend 12 and may generate and provide program messages. Although only one content provider 14 is illustrated, more than one content provider may be incorporated in the communication system 10. The headend 12 distributes the content through the satellite 22 and/or the network 42 to the user receiving devices 30 and/or the mobile device 31. The content provider 14 may include and/or be implemented as content provider server 49.

A data provider 50 may also provide data to the headend 12. The data provider 50 may provide various types of data such as schedule data or metadata that is provided within the program guide system. The metadata may include various descriptions, actor, director, star ratings, titles, user ratings, television or motion picture parental guidance ratings, descriptions, related descriptions and various other types of data. The data provider 50 may provide the data directly to the headend and may also provide data to various devices such as the mobile device 31 and the user receiving device 30 through the network 42. This may be performed in a direct manner through the network 42. The data provider 50 may include and/or be implemented as a data provider server 52.

The communication system 10 may further include a product and/or service provider 54, a payment service provider 56, an advertiser 58. The product and/or service provider 54, the payment service provider 56 and/or the advertiser 58 may respectively include and/or be implemented as a product and/or service provider server 60, a payment server 62 and/or an advertiser server 64. Although shown separately, two or more of the content providers 14, 50, 54, 56, and/or the advertiser 58 may be implemented as a single entity and/or a single server. The product and/or service provider server 60 may offer for sale products (e.g., non-content products, consumer products) and/or offer services (e.g., residential and/or business services, legal services, medical services, etc.) to users of the user receiving devices 30 and/or mobile devices 31. The payment server 62 may interact with the user receiving devices 30 and/or the mobile devices 31 to facilitate presenting offers, receiving acceptance of the offers and confirmation of the acceptance.

The advertiser server 64 may include an advertiser database 65 and may present offers in the form of ADs for products and/or services to the user receiving devices 30 and the mobile devices 31. The advertiser server 64 may generate AD messages indicating various parameters/information associated with the timing and playout of the ADs, as well as other related information. Due to Legacy equipment, partially implemented specifications, content provider configurations and use through automation systems, presentation of AD messages (e.g., SCTE-35 messages) to a service provider may be varied service to service. The POIS 13 receives the AD messages (e.g., via a real time event signaling and management (ESAM) application programming interface (API)), parses the AD messages, and on a service by service basis either maps the AD messages to the in-house format, drops the AD messages or verifies correct in-house format compliance then passes the message through. The POIS then sends out resulting mapped AD messages on a second interface (e.g., an ESAM API) to be re-inserted into a production stream. The mapping performed by a POIS is described below.

The parameters/information included in the AD messages received by the headend 12 and/or output by the POISs 13 may also include: an AD start or splice time field, an AD end field, a break duration field (duration of commercial break), a program start field, a program end field, a program early termination field, a program breakaway field, a program resumption field, a program resumption field, a program runover planned field, a program runover unplanned field, a program overlap start field, a program blackout override field, a chapter start field, a chapter end field, a provider AD start field, a program AD end field, etc. Other fields may also be included, such as: an encryption field, a splice command type field, a splice null field, a splice inert field, a splice event identifier field, a splice event cancel indicator flag, a program splice flag, a splice immediate flag, a unique program identifier, a time signal field, a splice command types field, and segmentation descriptors field. The encryption field may indicate a type of encryption of the AD message.

With respect to the splice command type field, examples of provider splice command types are shown in Table 1.

TABLE 1

| List of supported splice_command_type's | |
|---|---|
| splice_command_type value | Command |
| 0x00 | splice_null( ) |
| 0x05 | splice_insert( ) |
| 0x06 | time_signal( ) |

The POIS is able to inspect 0x00 splice_null( ), 0x05 splice_insert( ) and 0x06 time_signal( ) messages, all with and without segmentation descriptors. Segmentation descriptors are described in more detail below.

With respect to the splice null field, during a POIS inspection, a splice null without segmentation descriptors is considered a heartbeat and shall be dropped. When a splice null is received with a segmentation descriptor, the POISs 13 supports configuration to an output service provider standard in the in-house format. This may include performing a mapping to indicate whether an AD should be dropped, is a local AD, a national AD, or a provider AD. The resultant mapping may also indicate program start and end times/frames/packets, slate insertion, and whether to continue parsing. "Continue parsing" indicates that a POIS is to use further elements in the AD message to determine what action to take. Packet identifiers may be used to identify start and end packets and/or packets between which an AD is to be inserted.

With respect to the splice inert field, the POISs 13 inspect splice_insert( ) messages with or without segmentation descriptors. The POISs support a configuration to output an AD message in the in-house format (including drop, local AD, national AD, program start/end, slate, and continue parsing fields) when receiving a splice_insert( ) message.

With respect to the splice event identifier field, the POISs 13 parse splice_event_id (or splice event identifier). The splice_event_id may be used by providers to signal different purposes for splice_insert( ) messages. For example one range of splice_event_ids may be used to signal local ads, and a separate range of splice event ids may be used to signal national ads. The POISs 13 may either ignore the splice_event_id, or parse a predetermined number of most significant bits (e.g., four most significant bits (MSBs)) of the splice_event_id. The predetermined number of MSBs may be used by a content provider or advertiser to distinguish a purpose of a corresponding AD message (e.g., a SCTE-35 message). When a POIS is to generate a time signal with a segmentation descriptor to match a service provider in-house format message from a splice_insert message based on a splice_event_id, the POIS uses the splice_event_id as a segmentation event id in the generated output. The POISs 13 support a table to define the generated outputs according to the predetermined number of MSBs of the splice_event_id. Table 2 is an example of an implementation of a corresponding configuration table that may be stored in the POISs 13.

TABLE 2 splice_event_id mapping configuration table

| 4 MSB's splice_event_id | Service Provider In-house Formatted AD message |
|---|---|
| 0x0 | Drop; Local AD; National AD; Program Start/End; Slate; DC $_{Note\ 1}$ |
| 0x1 | Drop; Local AD; National AD; Program Start/End; Slate; DC |
| 0x2 | Drop; Local AD; National AD; Program Start/End; Slate; DC |
| 0x3 | Drop; Local AD; National AD; Program Start/End; Slate; DC |
| 0x4 | Drop; Local AD; National AD; Program Start/End; Slate; DC |
| 0x5 | Drop; Local AD; National AD; Program Start/End; Slate; DC |
| 0x6 | Drop; Local AD; National AD; Program Start/End; Slate; DC |
| 0x7 | Drop; Local AD; National AD; Program Start/End; Slate; DC |
| 0x8 | Drop; Local AD; National AD; Program Start/End; Slate; DC |
| 0x9 | Drop; Local AD; National AD; Program Start/End; Slate; DC |
| 0xA | Drop; Local AD; National AD; Program Start/End; Slate; DC |
| 0xB | Drop; Local AD; National AD; Program Start/End; Slate; DC |
| 0xC | Drop; Local AD; National AD; Program Start/End; Slate; DC |
| 0xD | Drop; Local AD; National AD; Program Start/End; Slate; DC |
| 0xE | Drop; Local AD; National AD; Program Start/End; Slate; DC |
| 0xF | Drop; Local AD; National AD; Program Start/End; Slate; DC |

Note 1—The DC field is selected when the splice_event_id is not used to generate a service provider in-house formatted message to output from a POIS.

If the splice event cancel indicator flag is set to 1, a POIS drops the AD message. With respect to the program splice flag, the program_splice_flag when set to 1 indicates that the AD message is a program splice mode message. An AD message with program_splice_flag set to 0 may be dropped by the POIS.

If the splice immediate flag is set to 0, the POISs 13 may inspect AD messages for other variables and perform other corresponding actions. If the splice immediate flag is set to 1, the POISs 13 may define the AD message as a pass-through message, a create time signal message, or a drop message. When set to create a time signal, the POISs 13 creates the appropriate out of network (Start Message) or into network message (End Message) using a time signal with no presentation timestamp (PTS) value and segmentation descriptors. The POISs 13 allow independent configurations of a splice immediate flag set to 1 and the out of network indicator set to either 1 or 0 for user flexibility in configuration of an output message. For example, this could allow for dropping of splice immediate messages that indicate an end of a local ad, where a pre-determined schedule is already in use. Network splice immediate flags may be dropped as not required for daily operation. Out of network messages may be kept and an in-house formatted message may be rewritten.

The unique program identifier may be used by providers to signal different purposes for splice_insert( ) messages. For example, one value of a unique_program_id may be used to signal local ads, and a separate value of a unique_program_id may be used to signal national ads. The POISs 13 may either ignore the unique_program_id or use the value of the unique_program_id to determine which in-house formatted message to output. The POISs 13 support a configuration table to determine a generated POIS output according to the unique_program_id value. Table 3 is an example configuration table, where 6 values in the left column are configurable, and where each of the 6 values is configurable to a unique POIS in-house formatted output (sometimes referred to as a new or second SCTE-35 message)

TABLE 3 unique_program_id mapping configuration table

| unique_program_id | Service Provider In-house Formatted AD message |
|---|---|
| Value 1 | Drop; Local AD; National AD; Program Start/End; Slate; DC $_{Note\ 1}$ |
| Value 2 | Drop; Local AD; National AD; Program Start/End; Slate; DC |
| Value 3 | Drop; Local AD; National AD; Program Start/End; Slate; DC |
| Value 4 | Drop; Local AD; National AD; Program Start/End; Slate; DC |
| Value 5 | Drop; Local AD; National AD; Program Start/End; Slate; DC |
| Value 6 | Drop; Local AD; National AD; Program Start/End; Slate; DC |

Note 1—DC field is selected when the unique_program_id is not used to determine the in-house formatted message to output.

With respect to the time signal field, the POISs 13 inspect time signal messages with or without segmentation descriptors. The POISs 13 support configuration to output an AD message in the in-house format (including drop, local AD, National AD, program start/end, slate, and a continue parsing field) message when receiving a time_signal( ) message.

Splice command type fields, including splice_schedule( ) messages, bandwidth_reservation( ) messages, private_command( ) messages, or reserved( ) messages may be dropped. With respect to the segmentation descriptors field, a segmentation_descriptor( ) is an implementation of a splice_descriptor( ). A segmentation descriptor provides an optional extension to the time_signal( ), splice_null( ) and splice_insert( ) commands that allows for segmentation messages to be sent in a time accurate method. The POISs 13 allow for inspection and user configurable actions based on segmentation_descriptor( ) found within time_signal( ), splice_null( ) and splice_insert( ) commands. The POISs 13 allow for mapping of a segmentation_descriptor( ) within a splice_null( ) command to either a time_signal( ) or splice_insert( ) command. If multiple segmentation_descriptors( ) are present on the input time_signal( ), splice_null( ) or splice_insert( ) command, the POISs 13 parse the multiple segmentation_descriptor( ) messages. An AD message is then created using proper translation to the in-house format. Unnecessary segmentation_descriptors( ) may be dropped. The POISs 13 output a time_signal( ) or splice_insert( ) according to the input, and allow for splice_null to be user defined to the time_signal( ) or splice_insert( ) with the translated segmentation_descriptors( ). The POISs 13 parse the segmentation_type_id and allow for a matrix indicating whether to pass-through, drop or map an AD message to a service provider in-house formatted message.

TABLE 4 segmentation_type_id table

| Segmentation_type_id | Service Provider In-house Formatted AD message |
|---|---|
| 0x00 | Drop; Local AD; National AD; Program Start/End; Slate; DC $_{Note\ 1}$ |
| 0x01 | Drop; Local AD; National AD; Program Start/End; Slate; DC |
| 0x10, 0x11 | Drop; Local AD; National AD; Program Start/End; Slate; DC |
| 0x12, 0x13 | Drop; Local AD; National AD; Program Start/End; Slate; DC |
| 0x14, 0x15 | Drop; Local AD; National AD; Program Start/End; Slate; DC |
| 0x16, 0x17 | Drop; Local AD; National AD; Program Start/End; Slate; DC |
| 0x20, 0x21 | Drop; Local AD; National AD; Program Start/End; Slate; DC |
| 0x30, 0x31 | Drop; Local AD; National AD; Program Start/End; Slate; DC |
| 0x32, 0x33 | Drop; Local AD; National AD; Program Start/End; Slate; DC |
| 0x34, 0x35 | Drop; Local AD; National AD; Program Start/End; Slate; DC |
| 0x40, 0x41 | Drop; Local AD; National AD; Program Start/End; Slate; DC |

Note 1—DC field is selected when the segmentation_type_id is not used to generate an in-house formatted AD message to output.

As stated above, the POISs 13 may receive first AD messages (or first SCTE-35 messages) of different types from different content providers and/or advertisers and convert the first AD messages to second AD messages (or second SCTE-35 messages). The second AD messages may all be of the same in-house configuration, syntax, format, and/or type. The fields of the first AD messages may be referred to as input fields. The fields of the second AD messages may be referred to as output fields. The second AD messages may include the same fields with corresponding values. Each of the fields of the first AD messages and the second AD messages may have respective (i) segmentation type identifiers indicating a type of segmentation, (ii) segment numbers indicating a specific chapter or AD, and (iii) segment expected fields indicating an expected number of individual segments (e.g., chapters) within a current segmentation event.

During the conversion or mapping of the first AD messages to the second AD messages, a conversion matrix may be used to convert the input fields to local ad, provider ad, national ad, program boundary and/or slate entries, which are used as or to generate the output fields (the fields of the second AD messages). The local AD entries correspond to ADs that are to be played out for POP devices within a local area, certain POP devices, and/or POP devices of a certain type. Provider AD entries correspond to ADs that are specific to a content provider and/or advertiser. National entries correspond to ADs that may be broadcast to all POP devices. Program boundary entries indicate a start of a program and whether the program can be interrupted and an AD can be inserted. Slate insertion refers to program interruptions and/or messages being displayed to indicate information other than that provided in ADs. Slate insertion may refer to display of a screen indicating that a technical difficulty exists and a program is temporarily interrupted due to the technical difficulty.

The POISs 13 receive and map the AD messages prior to being forwarded to the devices 30, 31 and/or other POP devices. The AD messages may be mapped on a service-by-service basis. The servers 49, 52, 60, 62 and 64 may communicate with the user receiving devices 30 and mobile devices via the network 42 and/or router 44.

The communication system 10 may also include a cloud network 66 (referred to as "the cloud"). The cloud network may include a cloud server 68. The cloud server 68 may store various types of information and/or data which may be accessible by the headend 12, the servers 49, 52, 60, 62, 64, the user receiving devices 30 and the mobile devices 31. The various types of information and data may include, for example, user information, billing information, offers, ads including upsell and/or cross-sell ads, object (product and/or service) information, etc.

Figure 2:
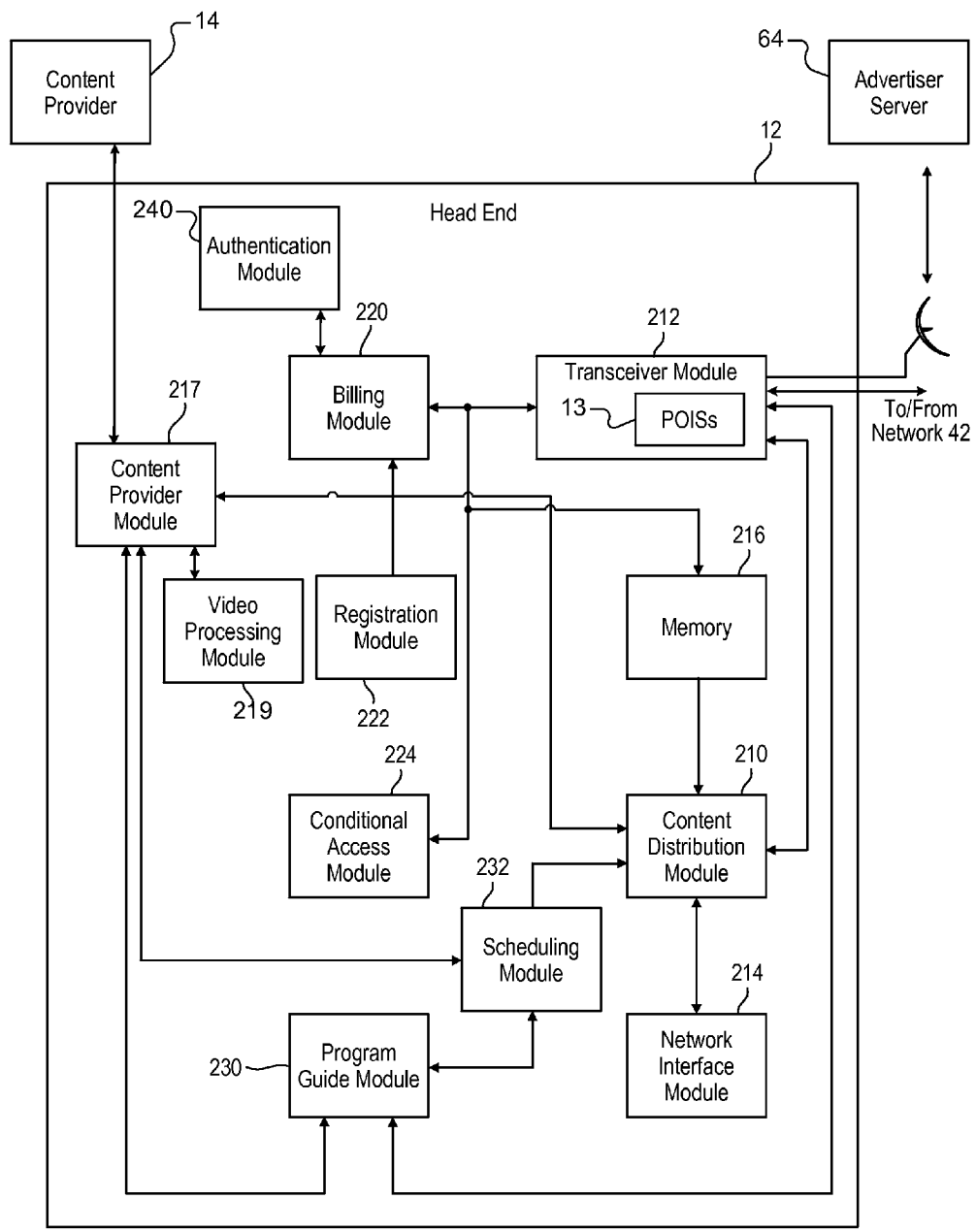
FIG. 2 is a functional block diagram of a headend in accordance with the present disclosure.

FIG. 2 shows the headend 12. It should be noted that the headend 12 is illustrated as a single device or facility, but may refer to multiple devices and/or facilities. That is, each of the individual components illustrated within the headend 12 may be physically located in various locations. The headend 12, one or more of the modules of the headend 12, and/or the memory of the headend 12 may be included in the content provider 14.

The headend 12 includes an output (or transceiver) module 212. The output module 212 includes the POISs 13, which may receive and map AD messages from the advertiser server 64. The advertiser server 64 (or another advertiser server that is in communication with the advertiser server 64) may be implemented in the headend 12 and provide the AD messages. The headend 12 may include a content distribution module 210 that is used for distributing content through different means. The headend 12 may be in communication with an output module 212 for uplinking content to a satellite through the satellite antenna 18 as illustrated in FIG. 1 and/or transmitting signals to and/or receiving signals from the network 42. The output module may include and/or be implemented as an interface and/or a transceiver. The content distribution module 210 may thus format the signal in an appropriate format for uplinking through the output module 212. The output module 212 may uplink various content through the satellite to the user receiving devices 30 and/or the mobile devices 31 (collectively referred to as receiving devices) of FIG. 1. The content distribution module 210 may also transcode the content in formats suitable for use by the receiving devices.

The output module 212 may also communicate conditional access data to the receiving devices for accessing the content. The conditional access data may be communicated in a conditional access packet that includes data for tuning the receiving devices to receive the data. The conditional access data may be received directly or indirectly from a conditional access module 224. The conditional access module 224 may provide conditional access signals to a billing module 220 to allow a particular user access to content. The conditional access module 224 may generate a conditional access packet (CAP) together with data from the billing module 220 for uplinking through the output module 212. If the content is satellite content, access data such as, but not limited to, the particular transponder, channel and time at which the content is broadcasted may be provided in the CAP. If the content is to be provided over an Internet or other broadband-type network, an IP address of the content may be provided. The CAP may also include encryption/decryption information for the receiving devices to receive the content and decode the content.

The content distribution module 210 may also be in communication with a network interface module 214. The network interface module 214 may be in communication with the network 42 (shown in FIG. 1) for communicating content therethrough. The network interface module 214 (or the content distribution module 210) may format the content signals into internet protocol signals for distribution through the network 42.

The content distribution module 210 may also be in communication with content memory 216. The content memory 216 may be referred to as a content repository. The content memory 216 may receive content from a content providing module 217 for distribution through the satellite system or the network 42. The content providing module 217 may receive content from the content provider 14. The content memory 216 may save on-demand or PPV content therein.

The content providing module 217 may also provide live television content for distribution through the content distribution module 210. The content distribution module 210 may thus communicate live content through the output module 212 or through the network interface module 214 to the appropriate networks. The content providing module 217 may provide content and/or ads to a video processing module 219, which may perform image recognition to detect products and generate corresponding metadata. This is described in further detail below.

The content providing module 217 processes received content for communication through the satellite 22 or network 42. The content providing module 217 may communicate live content as well as recorded content. The content memory 216 may store on-demand or PPV content for distribution at various times. The PPV content may be broadcasted in a linear fashion (at a predetermined time according to a predetermined schedule). Linear content may be presently broadcasted and may also be scheduled to be broadcasted in the future. The content memory 216 may also store on-demand content therein. On-demand content is content that is broadcasted at the request of a user receiving device and may occur at any time (not on a predetermined schedule). On-demand content is referred to as non-linear content.

A billing module 220 may also be incorporated into the headend 12. The billing module 220 may be used for associating one or more receiving devices with a user account. For example, different types of receiving devices such as mobile devices and one or more fixed set top boxes may be associated with a user account. By associating the receiving devices with a user account, content may be shared or accessed by each of the receiving devices associated with the account.

A registration module 222 may be used to associate each of the receiving devices with a user account at the billing module 220. The registration module 222 may be an automated system through which the user calls or accesses remotely by computer for associating the receiving devices with the account. The registration module 222 may also be partially human activated in which a customer service representative enters data for multiple receiving devices and associates the receiving devices with an account.

A program guide module 230 may also be included within the headend 12. The program guide module 230 receives metadata and other data from the content providing module 217. The program guide module 230 is ultimately used to communicate content and metadata to the output module 212. The program guide module may thus contain data related to the ratings of the particular content to be broadcasted and controlled by the content distribution module 210.

The program guide module 230 communicates program guide data to the user receiving devices 30 illustrated in FIG. 1. The program guide module 230 may create various objects with various types of data. The program guide module 230 may, for example, include schedule data, various types of descriptions for the content and content identifier that uniquely identifies each content item. The program guide module 230, in a typical system, communicates up to two weeks of advanced guide data for linear content to the user receiving devices. The guide data includes tuning data such as time of broadcast data, end time data, channel data, and transponder data to name a few. Guide data may also include content available on-demand and pay-per-view content.

A scheduling module 232 may be in communication with the program guide module 230 and the content distribution module 210 to arrange the content to be distributed as well as provide program guide data for the content to be distributed. The scheduling module 232 may also be in communication with the content providing module 217 for obtaining a schedule for live channel broadcast.

An authentication module 240 may be used to authenticate various user receiving devices and mobile devices that communicate with the headend 12. The authentication module 240 may be in communication with a billing module 220. The billing module 220 may provide data for subscriptions and various authorizations suitable for the user receiving devices and the mobile devices. The authentication module 240 ultimately permits the user receiving devices and mobile devices to communicate with the headend 12. Authentication may be performed by providing a user identifier, a password, a user device identifier or combinations thereof. Channels and/or programs may be provided to the user receiving devices and/or mobile devices based on passcodes, as further described below.

Figure 3:
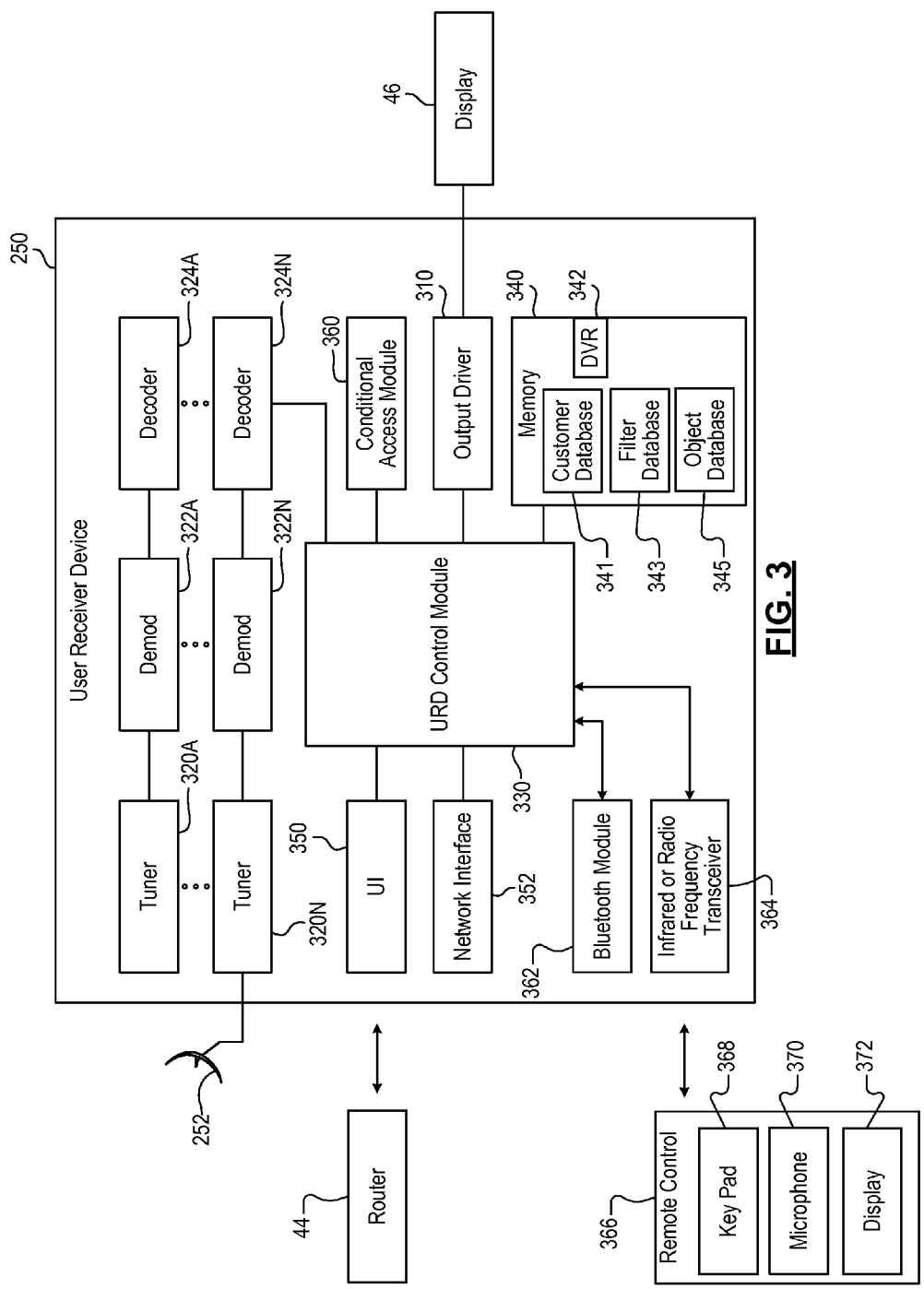
FIG. 3 is a functional block diagram of a user receiving device in accordance with the present disclosure.

FIG. 3 shows a user receiving device 250 that may replace any of the user receiving devices 30 of FIG. 1. Although, a particular example using the user receiving device 250 as a satellite set top box is illustrated, it is merely representative of various electronic devices with an internal control module (or controller) used as a content receiving device. An antenna 252 may be one of a number of different types of antennas used for receiving satellite signals that may include one or more low noise blocks associated therewith. The antenna 252 may be a single antenna used for satellite television reception. Of course, multiple antennas for receiving signals from satellites in different orbital slots may be used. In a terrestrial system such as a cable television system, no antenna may be used. Rather, a connector to a fiber optic or coaxial cable may be used. Terrestrial systems may have an antenna suitable for receiving terrestrial wireless signals. The user receiving device 250 is connected to a display (e.g., one of the displays 46). The user receiving device 250 may have an output driver 310 for formatting video and audio signals for output to the display 46.

A user receiving device control module 330 may be used to coordinate and control the various functions of the user receiving device 250. The user receiving device control module 330 may include and/or be implemented as a controller. These functions may include functions of: tuners 320A-320N (collectively 320); demodulators 322A-322N (collectively 322); decoders 324A-324N (collectively 324) such as forward error correction decoders; and any corresponding buffers and/or other related functions.

The tuners 320 receive respective signals or data from corresponding individual channels. The tuners 320 may receive data from a satellite or a source such as cable or over-the-air TV broadcasts. The tuners 320 may receive television programming content, program guide data or other types of data. The demodulators 322 demodulate the signals or data to form a demodulated signal or data. The decoders 324 decode the demodulated signals to form decoded data or decoded signals. By providing a number of tuners, demodulators and decoders, a number of different content programs may be used by the user receiving device 250. For example, live viewing and recording may be performed simultaneously. A number of recordings may be made simultaneously depending on the number of tuners available.

The user receiving device control module 330 is in communication with a memory 340. The memory 340 is illustrated as a single box. The memory 340 may be implemented as multiple different types of memories including a hard drive, a flash drive and various other types of memory devices. The memory 340 may be other types of memory or sections of different types of memory. The memory 340 may be non-volatile memory or volatile memory. The memory 340 may include a customer database 341 and a DVR 342. The DVR 342 may include recorded content stored for later playback.

The memory 340 may include storage for various operational data collected during operation of the user receiving device 250. For example, the memory 340 may store user configuration data for each user associated with a device or system. The user configuration data may include rating limits set by a user of the user receiving device 250. A default user configuration may also be established in case visual recognition is not achieved. This will be described in detail below. Other types of data in the memory 340 may include the channel subscription data, the blocked channels, adult channels, current set top box language, TV resolution data, to do list data, the conditional access module identifier, time zone data, time of day daylight savings, status data, aspect ratio data, viewing hours data, quick tune list and a zip code.

The memory 340 may also store the advanced program guide data. The memory 340 may store program guide data that is received from the headend. The program guide data may include amounts of data including two or more weeks of program guide data. The program guide data may be communicated to the user receiving device 250 in various manners including through the satellite 22 of FIG. 1. The program guide data may include content or program identifiers, ratings and various data objects corresponding thereto.

The user receiving device 250 may also include a user interface (UI) 350. The UI 350 may include various types of user interfaces such as a keyboard, push buttons, a touch screen, and a voice activated interface or the like. The UI 350 may be used to: select a channel; change user profiles including acceptable ratings; select various information such as content selections; change the volume; change the display appearance; and/or perform other functions. The UI 350 may also be used for selecting playback locations of the content.

A network interface 352 may be included within the user receiving device 250 to communicate various data through the networks 36, 42 described above. In one implementation, the user receiving device 250 does not include the network interface 352. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The user receiving device 250 may also include a conditional access module 360. The conditional access module 360 prevents unauthorized reception of the television signals through the antenna 252. The conditional access module 360 may use a cryptographic hash to authorize the use and display of the received signals. The conditional access module 360 may receive the proper codes or signals from the headend.

The user receiving device control module 330 may also be connected to a Bluetooth module 362 (is Bluetooth® enabled). The Bluetooth module 362 may include and/or be implemented as a Bluetooth transceiver. The Bluetooth transceiver may be in communication with mobile devices (e.g., the mobile devices 31 of FIG. 1). The user receiving device control module 330 may communicate with the mobile devices 31 via the router 44 and/or the Bluetooth transceiver. The transceivers disclosed herein may include and/or be implemented as transceivers.

The user receiving device control module 330 may also include an infrared or radio frequency transceiver 364 for communication with a remote control device 366. The remote control device 366 may be used to, for example, change a channel of the user receiving device 250. The remote control device 366 may also be used to, for example, resume viewing of a channel and/or a video, as is further described below. The remote control device 366 may include a keypad 368 for generating key signals that are communicated to the user receiving device 250. The remote control device 366 may also include a microphone 370 for receiving an audible signal and converting the audible signal to an electrical signal. The electrical signal may be communicated to the user receiving device 250. The remote control device 366 may also include a display 372.

Figure 4:
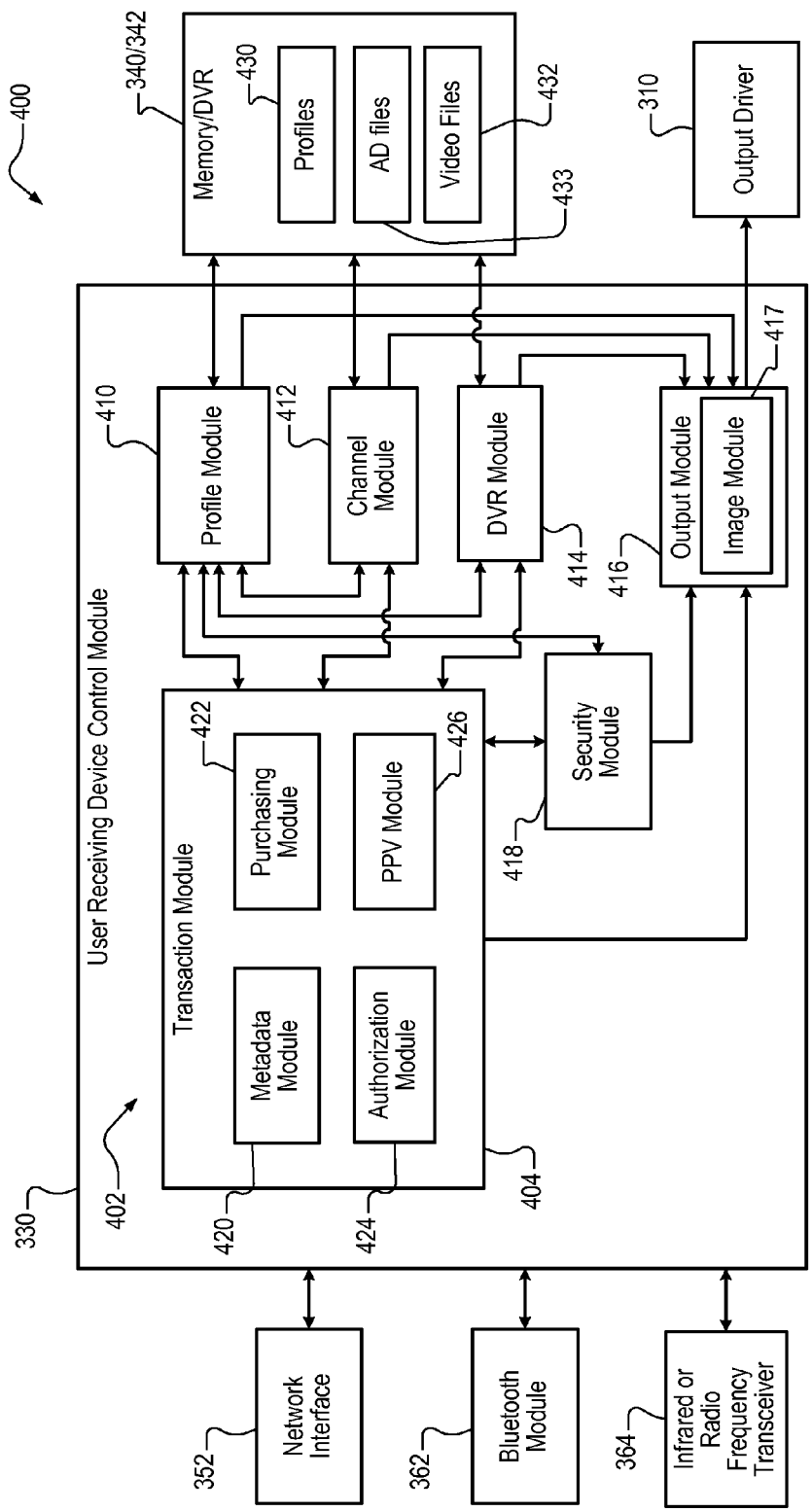
FIG. 4 is a functional block diagram of a control module of the user receiving device of FIG. 3.

FIG. 4 shows a portion 400 of a user receiving device (e.g., one of the user receiving devices 30, 250 disclosed above). The portion 400 includes the output driver 310, the user receiving device control module 330, the network interface 352, the Bluetooth module 362, and the transceiver 364. The portion 400 also includes the memory 340 and the DVR 342, which are shown collectively as memory/DVR 340/342. The user receiving device control module 330 includes a transaction system 402. The transaction system 402 includes a transaction module 404, a profile module 410, a channel module 412, a DVR module 414, an output module 416 and a security module 418.

The transaction module 404 includes a metadata module 420, a purchasing module 422, an authorization module 424, and a pay-per-view (PPV) module 426. The metadata module 420 monitors metadata to detect purchasable objects in a video. The purchasing module 422 may control purchasing of content by a user of a mobile device. This may include receiving and/or exchanging identification information, billing information, and/or contact information with a mobile device of a user and/or a content provider. The stated information may be received from the mobile device and transferred to the content provider or may be provided by the content provider. The stated information may be stored in the memory 340 and accessed by any of the modules 420, 422, 424, 426. The purchasing module 422 may provide confirmation request messages, which may be displayed to confirm that the user wants to purchase certain selected content. The confirmation request messages may have originated at and/or have been received from the content provider.

The authorization module 424 may perform one or more handshake processes with the headend, the content provider, and/or a mobile device to authorize (or reauthorize) reception and/or display of content on a display of the corresponding user receiving device and/or the mobile device. The content may be PPV content or other content. In one embodiment, the authorization module 424 receives authorization signals from a content provider to permit downloading and/or displaying of certain content.

The authorization module 424 may generate authorization preview screens and/or authorization messages. The authorization module 424 may display via the output module 416 the authorization preview screens and the authorization messages. The authorization preview screen may be a blank (or black) screen or may provide, for example, an image of a scene of the content attempting to be accessed by a user. The authorization preview screen may include an authorization message and/or a code.

The pay-per-view (PPV) module 426 may generate PPV preview screens and/or PPV messages. The PPV module 426 may display via the output module 416 the PPV preview screens and the PPV messages. The PPV preview screen may be a blank (or black) screen or may provide, for example, an image of a scene of the content attempting to be accessed by a user. The PPV preview screen may include a PPV message.

The profile module 410 manages profiles 430 of each of the mobile devices paired with the corresponding user receiving device. The profiles 430 may be stored in the memory 340 and accessed by the profile module 410. Each of the profiles 430 may have a unique identifier (ID) number, an assigned security level, and corresponding authorized channels, programs and/or videos. The security level may indicate which channels, programs, and/or videos are permitted to be displayed for the corresponding profile. Different profiles may have the same security level or different security levels. One or more mobile devices may be assigned to a profile and thus have a corresponding profile ID number. Each of the profiles may also include mobile device and/or profile specific features such as volume levels, maximum volumes, amount of time permitted ON over a predetermined period, a playlist of recorded videos, a preferred channel list, and other features. The profile module 410 may create each of the profiles 430 based on: parental control inputs; operation history of the corresponding mobile devices; time of day of watching a channel, program and/or video; and/or profile information provided by the corresponding mobile devices.

The channel module 412 may control selection and output of channels to the output driver 310 via the output module 416. The DVR module 414 may control selection, recording, and/or output of videos and ADs. The DVR module 414 may store videos as video files 432 and ADs as AD files 433 in the DVR 342 and output the videos and ADs via the output module 416 to the output driver 310 for display. The channel module 412 and the DVR module 414 may operate based on parental guidance controls. The channel module 412 and the DVR module 414 may provide channels and/or videos to the output module based on the profile ID number and/or the security level associated with a profile of one or more mobile devices. The videos may be stored as video files 432 in the memory 340 and/or DVR 342.

The output module 416 controls output of channels, programs, and/or videos to the output driver 310. This may be based on parental guidance controls. The output module 416 may output channels and/or videos to the output driver 310 based on the profile ID number and/or the security level associated with a profile of one or more mobile devices. The output module 416 includes an image module 417 that may alter a portion of an image of an object to alert a viewer of the object.

The security module 418 may control operation of the output module 416 based on a security level of a profile. The security module 418 may also be used to set passcodes and/or require a passcode to view certain channels, programs and/or videos. The security module 418 may be in communication with the mobile devices via the Bluetooth module 362.

FIG. 5 shows a mobile device 450. Any of the mobile devices of FIG. 1 may be configured as the mobile device 450. The mobile device 450 includes a mobile device control module 452 that controls various functions of the mobile device 450. The mobile device control module 452 includes a second transaction system 453 that includes a transaction module 454, a channel module 458, a video module 459, a profile module 460, an output module 462 and a security module 464. The transaction module 454 includes a metadata module 466, a second purchasing module 468, a second authorization module 470, and a second pay-per-view (PPV) module 471. The metadata module 466 monitors metadata to detect purchasable objects in a video.

The purchasing module 468 may control purchasing of content by a user of a mobile device. This may include receiving and/or exchanging identification information, billing information, and/or contact information with a user receiving device and/or a content provider. The stated information may be stored in the memory 340 and accessed by any of the modules 466, 468, 470 and 471. The purchasing module 468 may provide confirmation request messages, which may be displayed on the mobile device to confirm that the user wants to purchase certain selected content. The confirmation messages may have originated at and/or have been received from the user receiving device and/or the content provider.

The authorization module 470 may perform a handshake process with the headend and/or the content provider disclosed above to authorize (or reauthorize) reception and/or display of content on a display of a user receiving device and/or the mobile device. An authorization signal for selected content may be received from a headend or content provider and forwarded from the mobile device to the user receiving device. The authorization signal permits downloading and/or displaying of certain content.

The PPV module 471 may control PPV purchase requests. The PPV module 471 may generate request signals for PPV content. The PPV request signals may include channel, program and/or video identification information. This information may be provided to a headend, content service provider and/or user receiving device. The PPV module 471 may receive PPV content from the headend, the content provider and/or the user receiving device and forward the content to the channel module, the video module, and/or the memory 482. The PPV module 471 may display the content via the output module 462 on the display 472.

The profile module 460 manages profiles of the mobile device 450 and/or other mobile devices. The profiles 480 may be stored in memory 482 and accessed by the profile module 460. The profiles 480 may have respectively a unique ID, an assigned security level, and corresponding authorized channels, programs and/or videos. The profile ID may be assigned by a user receiving device. The security level may be assigned by another mobile device (e.g., parental device) and/or a user receiving device. The security level may indicate which channels, programs, and/or videos are permitted to be displayed for the corresponding profile. Each of the profiles may also include mobile device and/or profile specific features such as volume levels, maximum volumes, time permitted ON over a predetermined period, a playlist of recorded videos, a preferred channel list, and other features. The profile module 460 may create the profiles 480 based on parental control inputs, operation history of the corresponding mobile devices, and/or profile information provided by the corresponding mobile devices. As an alternative, the profile module 460 may receive one or more of the profiles 480 from a user receiving device. The profile module 460 may store user profile data within the mobile device 450. The profile module 460 may store user settings, such as favorites and parental controls. The profile module 460 may also receive profile data from the headend 12.

The output module 462 controls output of signals, guides, channels, programs, and/or videos to the display 472. Although not shown, the mobile device control module 452 may include guide, channel, program, and/or video modules for the accessing and/or displaying respectively of guides, channels, programs, and/or videos. The output module 462 may output signals, guides, channels, programs, and/or videos to the display 472 based on the profile ID and/or the security level associated with the profile 480. The output module 462 includes an image module 463 that may alter a portion of an image of an object to alert a viewer of the object.

The security module 464 may control operation of the output module 462 based on a security level of the profile 480. The security module 464 may also be used to set passcodes and/or require a passcode to view certain channels, programs and/or videos. The security module 464 may be in communication with user receiving devices via a Bluetooth module 484 and/or other interface and/or transceiver.

In one implementation the mobile device 450 may be used as a remote control device and send signals to a user receiving device to select a channel, program and/or video. In another embodiment, the security module 464 provides a passcode, which may be entered by a user of the mobile device 450. Content received by the mobile device control module 452 may be stored in the memory. This may include programs and/or videos (shown as program files 486) and ADs (shown as AD files 487).

The mobile device control module 452 is in communication with a microphone 488 that receives audible signals and converts the audible signals into electrical signals. The audible signals may include a request signal. The request signal may be to perform a search and/or to obtain guide data, network data and/or playlist data. The mobile device control module 452 is also in communication with a user interface 490. The user interface 490 may include buttons, input switches and/or a touch screen.

The mobile device control module 452 is also in communication with a network interface 492. The network interface 492 may be used to interface with the network 42 of FIG. 1. As mentioned above, the network 42 may be a wireless network or the Internet. The network interface 492 may communicate with a cellular system or with the internet or both. A network identifier may be attached to or associated with each communication from the mobile device 450.

Various examples are disclosed below with respect to the embodiments of FIGS. 6-8 and other embodiments of the present disclosure. Although one or more of the embodiments are primarily described with respect to a content provider, all of the tasks performed by the content provider may be performed by a headend, a content service provider, a network, and/or an intermediary device in communication with a corresponding mobile device, headend, and/or the content provider.

Figure 6:
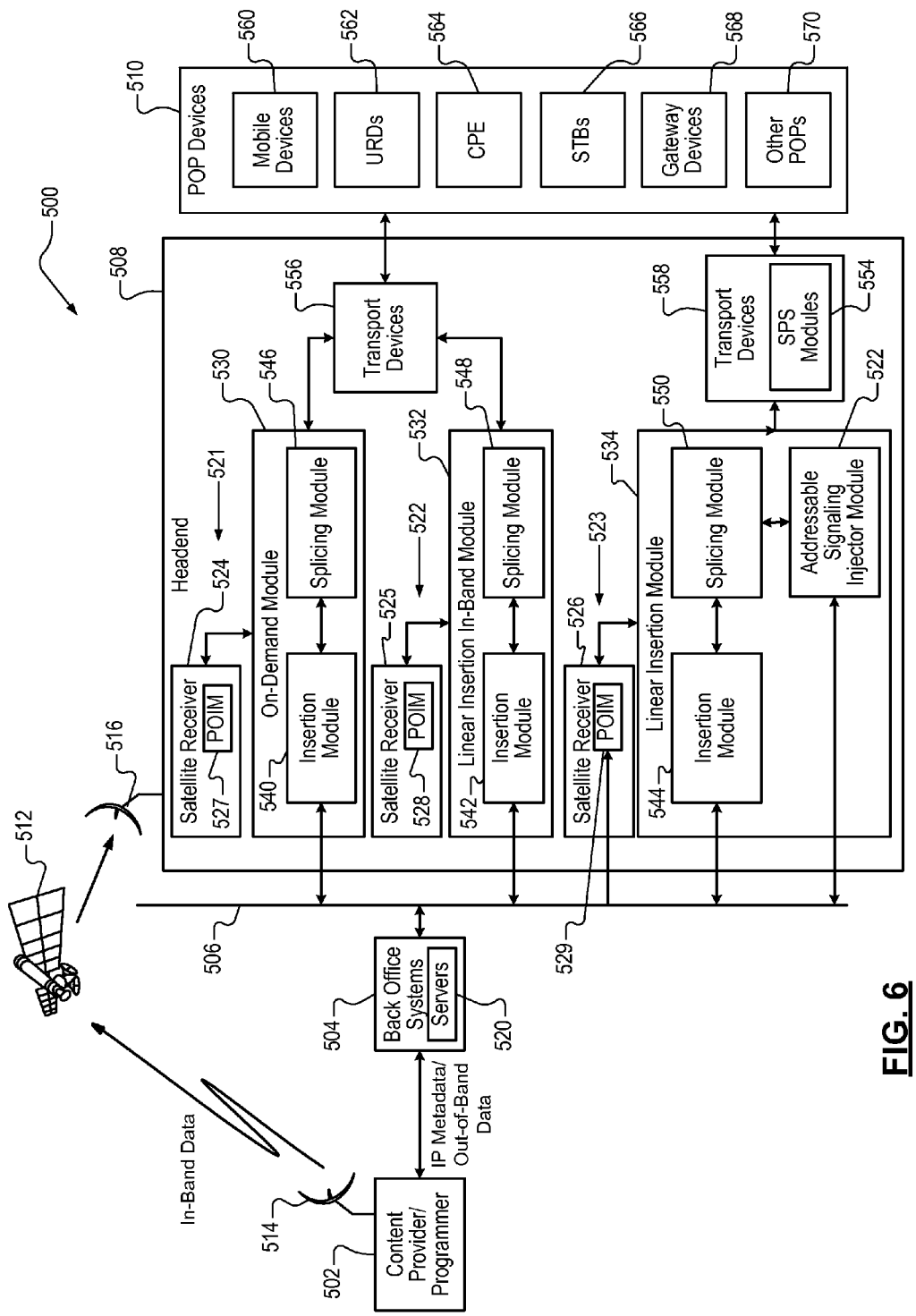
FIG. 6 is a functional block diagram of a distribution system incorporating placement opportunities information systems in accordance with the present disclosure.
Figure 7:
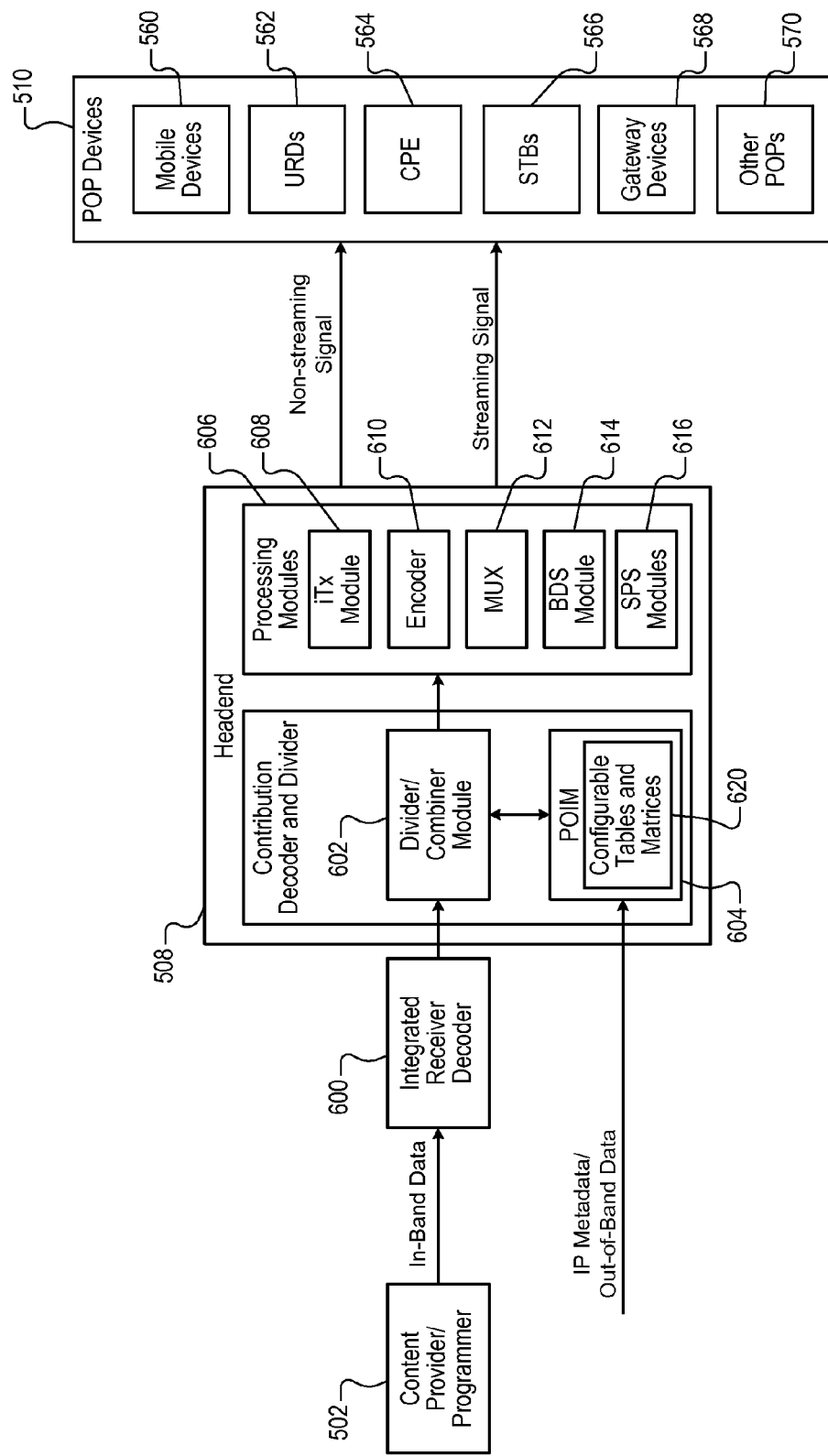
FIG. 7 is a functional block diagram of a portion of the distribution system of FIG. 6 incorporating a placement opportunities information system in accordance with the present disclosure.
Figure 8:
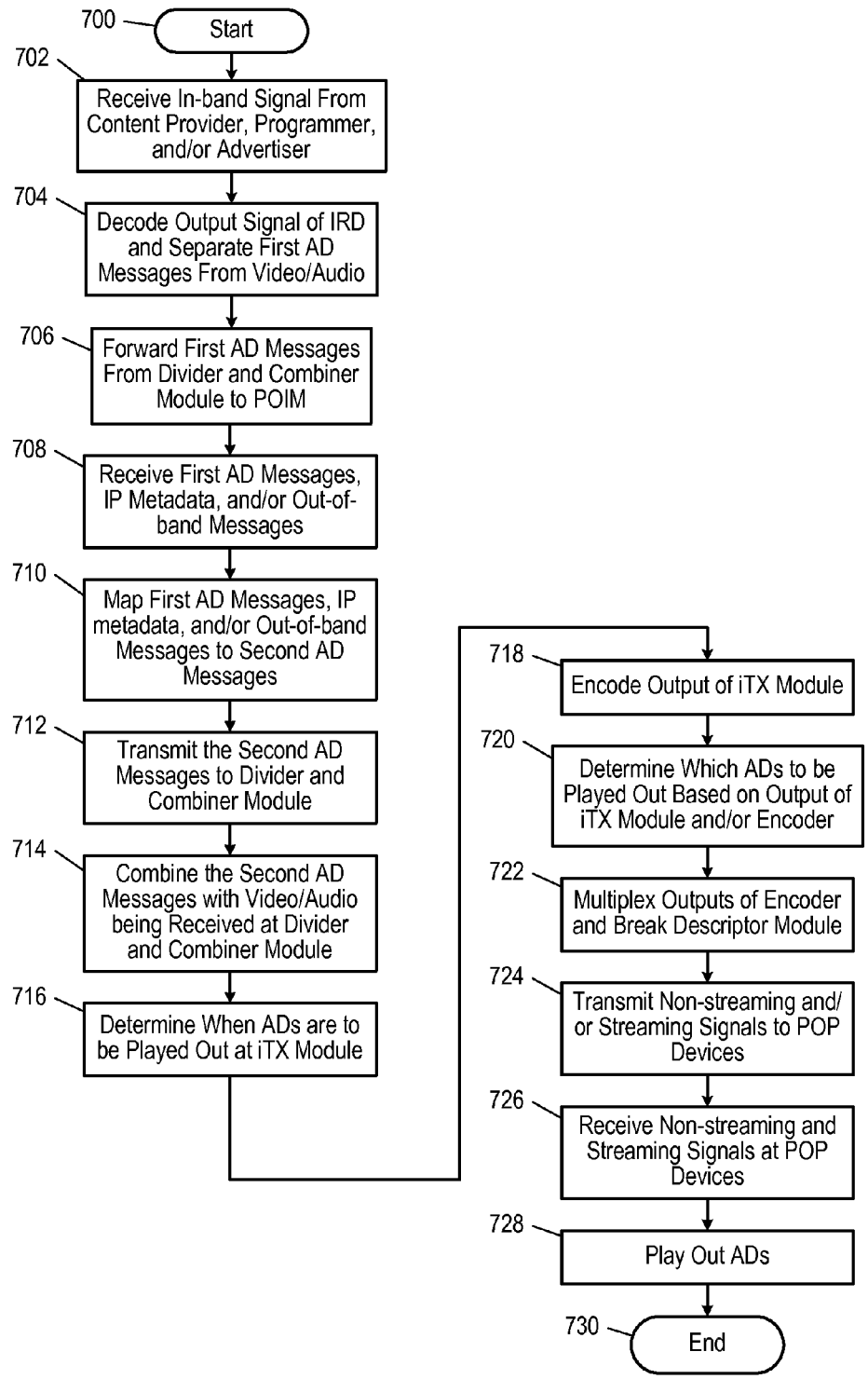
FIG. 8 illustrates a method of distributing and mapping messages in accordance with the present disclosure.

For the embodiments of FIGS. 6-8 and other embodiments disclosed herein, the mobile devices and/or POP devices may include software applications (referred to as "apps") with corresponding screens (or windows). The apps may be executed via one or more modules (e.g., control modules) of the mobile devices and/or POP devices and may allow a user to send various types of information disclosed herein to a user receiving device and/or a content provider. The apps and corresponding screens may allow the user to perform various tasks such as confirming a purchase, send billing information, send contact information, answer questions in a survey, select a product, etc. As used herein, the terms "user" may refer to an individual associated with an account provided by a content provider (e.g., a customer) or other user.

FIG. 6 shows a distribution system 500 that includes a content provider and/or programmer (referred to as the content provider) 502, back office systems 504, a bus 506, one or more headends (one headend 508 is shown), and POP devices 510. The content provider 502 may communicate with the headend 508 via a satellite 512 and respective antennas 514, 516. This communication is over in-band channels. Non-streaming content may be provided using the in-band channels. The content provider 502 may also communicate with the back office systems 504 using out-of-band channels via, for example, a terrestrial network. The back office systems may include servers 520, such as a subscriber information server, a placement opportunities management server, a content management server, a VOD management server, and a linear management server. The servers 520 may communicate with the content provider 502 and with modules of the headends, as shown for headend 508. The out-of-band channels may be used for transmitting streaming content, program messages and AD messages (referred to as out-of-band data). The out-of-band program and AD messages may be provided in extensible markup language (XML) documents. The out-of-band program and AD messages may be provided to supplement information in in-band program and AD messages and/or may be provided as distinct program message or distinct AD messages.

Each of the headends is a large data center that is located at a central location and includes multiple systems. Each of the headends may replace the headend 12 of FIG. 1 and/or be configured as shown in FIG. 2. As an example, each of the systems may be implemented as one or more servers or modules. The servers and/or modules may have the same information and/or may share any of the information stored at any one or more of the servers.

The headend 508 is shown as an example and includes POISs 521, 522, 523. The POISs 521, 522, 523 include respective satellite receivers 524, 525, 526 with POIMs 527, 528, 529. The satellite receivers 524, 525, 526 receive in-band signals including program content, first program messages and first AD messages (referred to as in-band data). The satellite receivers 524, 525, 526 may decode the received in-band signals. The POIMs perform mapping of the first program and AD messages to second program and AD messages, as described above. The headend 508 also includes an on-demand module 530, a linear insertion in-band module 532, a linear insertion module 534 and transport devices 536. The modules 530, 532 are directed to non-streaming content, in-band signals and corresponding POP devices. The modules 530, 532 are not directed to out-of-band signals. The module 534 is directed to streaming content and corresponding POP devices and both in-band signals and out-of-band signals. The modules 530, 532, 534 include respective insertion modules 540, 542, 544 and splicing modules 546, 548, 550.

The insertion modules 540, 542, 544 (may be referred to as iTX systems or modules) are automation and scheduling modules that receive and process the second AD signals and determine the correct timing and/or insertion location for ADs. The first insertion module 540 may be used for in-band VODs and ADs. The second insertion module may be used for in-band programs and ADs. The third insertion module 544 may be used for in-band content and/or out-of-band content and ADs.

The splicing modules 546, 548 may perform multiplexing and break descriptor functions and thus determine which ADs to play out during the appropriate times or insertion locations, as determined by the insertion modules. Each of the splicing modules 546, 548 may include a multiplexer and a break descriptor module, as shown in FIG. 7. The break descriptor functions may be performed by break descriptor servers. The splicing module 550 may not perform break descriptor functions, as similar functions may be performed by streaming processor server modules 554 (e.g., a multi-bit rate streaming processor module (MSPS) located downstream. The MSPS breaks up the encoded content into segments (or predetermined amounts of content). The segments (or smaller files) are sent to the POP devices 506. The linear insertion module 534 may also include an addressable signaling injector module 552 for addressing out-of-band signals. The addressable signaling injector module 552

The headend 508 may further include transport devices 556, 558. The transport devices 556, 558 transport the in-band and out-of-band outputs of the modules 530, 532, 534 to corresponding ones of the POP devices 510. The transport devices 558 include the SPS modules 554.

The POP devices 510 may include mobile devices 560, URDs 562, customer premise equipment (CPE) 564, STBs 566, gateway devices 568, and/or other POP devices 570. The other POP devices 570 may be STBs that operate as gateways, routers, etc. The routers may include non-volatile memory including solid-state memory and/or hard disk drives. Example service providers are DirectTV®, Netflix®, VooDoo®, etc. Each of the service providers may have respective rules for different types of content, POP devices, customers, etc.

FIG. 7 shows a portion of the distribution system 500, which includes the content provider 502, an integrated receiver decoder (IRD) 600, the headend 508 and POP devices 510. The headend 508 includes a divider and combiner module 602, a POIM 604 and processing modules 606. The content provider 502, headend 508, and POP devices 510 may be configured and/or operated as described above with respect to the content providers, headends, and POP devices associated with FIGS. 1-6. The POIM 604 may be connected to the divider and combiner module 602 via a bi-directional bus 609 and/or ESAM APIs (one at each of the modules 602, 604). The signals and messages sent over the bi-directional bus as disclosed herein may be referred to respectively as ESAM signals and ESAM messages. The POIM 604 may include configurable tables and matrices 620. Parameter values and/or statuses of entries/flags in the configurable tables and matrices may be user adjustable. The tables may include any of the tables disclosed herein. The matrices may be used to relate commands, parameter values, flags, and/or other elements included in first program messages and first AD messages having different formats received from content providers and/or advertisers to corresponding elements of second program messages and second AD messages. The second program messages and the second AD messages have the single in-house format. The second program messages may have the same format, which may be different than the format of the second AD messages. The processing modules 606 may include an iTX module 608, an encoder 610, a multiplexer 612, a break descriptor (BDS) module 614, and SPS modules 616. Operation of the content provider 502, the IRD 600, the headend 508 and the POP devices 510 is further described below with respect to the method of FIG. 8.

For further defined structure of the modules of FIGS. 1-7 see below the provided method of FIG. 8 and below provided definition for the term "module". The systems disclosed herein may be operated using numerous methods, an example method is illustrated in FIG. 8. Operations associated with one or more of the modules 530, 532, 534 of FIG. 6 and/or operation of the portion of the distribution system 500 shown in FIG. 7 may be implemented as described with respect to the method of FIG. 8. In FIG. 8, a method of distributing and mapping messages is shown. Although the following tasks are primarily described with respect to the implementation of FIG. 7, the tasks may be easily modified to apply to other implementations of the present disclosure. The tasks may be iteratively performed.

The method may begin at 700. At 702, the IRD 600 receives an in-band signal from the content provider 502, channel decodes the in-band signal to provide an output signal. The in-band signal and the output signal may each include one or more video and/or audio signals. The output signal may be a movie picture experts group (MPEG) transport stream (TS) signal including non-streaming video, first program messages and first AD messages. The first program messages and first AD messages may be SCTE-35 messages or other type of program and/or AD messages. The first AD messages may indicate (i) times when ADs are to be played out, (ii) frames or packets of the received video between which the ADs are to be played out, and/or (iii) other information as described above. The received video may include pay-to-own video, pay-to-rent video, broadcasted or non-broadcasted programs, and/or other video content. The first AD messages may be provided on a same set of one or more channels as the video content and corresponding audio content. The first AD messages may be frequency and/or time multiplexed with the video and corresponding audio and/or transmitted in parallel with the video and audio content. The first AD messages may be transmitted earlier in time then (or a predetermined number of frames/packets relative to the video content and prior to when ADs corresponding to the first AD messages are to be played out. This provides time for the POP devices, receiving the first AD messages and/or indication signals indicating when the ADs are to be played out, to process the first AD messages and/or the indication signals and playout the ADs at the appropriate times.

At 704, the divider and combiner module 602 may include a decoder and decode the output signal to provide in-band data. The output signal may include a video signal, an audio signal, a first program message signal and/or a first AD message signal. The in-band data includes video data, audio data, first program message data and first AD message data. The divider and combiner module 602 separates the first program message signal/first program message data and the first AD message signal/first AD message data from the video and audio signals/data. At 706, the divider and combiner module 602 forwards the first program message signal/first program message data and the first AD message signal/first AD message data to the POIM 604.

At 708, the POIM 604 receives the first messages (first program messages and first AD messages) in the form of the first program message signal, the first program message data, the first AD message signal or the first AD message data from the divider and combiner 602. The POIM 604 may also receive Internet protocol (IP) metadata and/or out-of-band data in the form of an out-of-band signal from the content provider 502 and/or from a back office system or server (e.g., one of the back office systems 504 or servers 520 of FIG. 6). The IP metadata and/or out-of-band data is received via one or more out-of-band channels and may include program message data and/or AD message data. The out-of-band channels are different than the in-band channels. The IP metadata and/or out-of-band data may be used for checks and balances and may conform to an event scheduling and notification interface (ESNO) standard and follow the recommended practices as defined by both the Open Authentication Technical Committee (OATC) and/or the ANSI SCTE-67 standard. The AD message data received from the content provider 502, the back office systems 504 and/or one of the servers 520 may supplement the AD message data included in the first AD messages. If the first messages are not transmitted, the message data received from the content provider 502, the back office systems 504 and/or one of the servers 520 may be interpreted by the POIM 604 as first messages to be mapped to second messages.

At 710, the POIM 604 maps the first messages to second messages (first program messages to second program messages and/or first AD messages to second AD messages) based on and/or according to the configurable tables and/or matrices 620, as described above. The second messages may be second SCTE-35 messages, which are in the in-house format. This mapping may be on a service by service basis. The first messages include (i) the message data received from the divider and combiner module 602, and (ii) the message data received from the content provider 502, back office systems 504 and/or one of the servers 520 via the one or more out-of-band channels.

Some examples of fields of the first AD messages are disclosed above. The fields of the first AD messages may include, for example: local AD out of network fields, local AD return to network fields, national AD space out of network fields, national AD space return to network fields, slate insertion out of network fields, slate return to network fields, start of program fields, end of program fields, splice fields, etc. Additional fields are disclosed below.

The stated mapping may include adjusting a splice time and/or providing an offset. Often the splice_time( ) of SCTE 35 messages from content providers is not accurate. A POIM 604 allows for a user configurable offset per service for adjustments to the splice_time( ). This offset will be made by recalculating a pts time parameter in the splice_time( ). When the POIM 604 converts a splice_insert( ) or splice_null( ) message to a time_signal( ) message, the POIM 604 uses the splice_time( ) with an offset configured to create the time_signal( ) with pts time. If an incoming message (first AD message) is a time_signal( ) and a time specified_flag=0, then the POIM 604 passes through the message. However, if an offset is configured, the POIM 604 switches to a time_specified_flag=1 and inserts an appropriate pts_time in an output message (second AD message). The POIM 604 may follow SCTE-35 2014 rules on byte count for time_signal( ) to have the correct reserve bit counts when changing from a time_signal( ) immediate to a time_signal( ) with pts_time.

The following description defines the SCTE messages that the POIS may output. The POIS includes a clear and user friendly GUI to define configurable fields. The POIS allows for configuration of fields by file, script, wizard or other simplified means (e.g. XML). If the file based configuration is implemented, the POIS allows for export and import of configurations for external editing and/or importing. The POIS includes a clear interface control document (ICD) if utilizing the file based configuration. As an example, Table 5 is provided and defines how a POIM 604 may map the first AD messages to the second AD messages in the in-house format. The first column of Table 5 includes examples of inputs to the POIM 604, which are provided as input fields in the first AD messages. The $2^{nd}$ through $5^{th}$ columns of Table 5 provide output fields that the input fields may be mapped to and provided as part of the second AD messages. The fields in Table 5 are provided as examples and may be included or removed depending on the implementation.

TABLE 5

Configurable Matrix for Conversion to In-house Format

| First AD message Input Fields | Local Ad | Provider Ad | Program Boundary | Slate Insertion |
|---|---|---|---|---|
| splice_info_section( ) | | | | |
| table_ID | 0xFC | 0xFC | 0xFC | 0xFC |
| section_syntax_indicator | 0 | 0 | 0 | 0 |
| private_indicator | 0 | 0 | 0 | 0 |
| section_length. | set accordingly | set accordingly | set accordingly | set accordingly |
| protocol_version | 0 | 0 | 0 | 0 |
| encrypted_packet | False | False | False | False |
| encryption_algorithm | $000000_{binary}$ | $000000_{binary}$ | $000000_{binary}$ | $000000_{binary}$ |
| pts_adjustment | pass-through | pass-through | pass-through | pass-through |
| cw_index | 0x00 | 0x00 | 0x00 | 0x00 |
| tier | pass-through/0xFFF | pass-through/0xFFF | through/0xFFF | pass-through/0xFFF |

TABLE 5-continued

Configurable Matrix for Conversion to In-house Format

| First AD message Input Fields | Local Ad | Provider Ad | Program Boundary | Slate Insertion |
|---|---|---|---|---|
| splice_command_length | Set accordingly | Set accordingly | Set accordingly | Set accordingly |
| splice_command_type | 0x05 | 0x06 | 0x06 | 0x06 |
| descriptor_loop_length | set accordingly | set accordingly | set accordingly | set accordingly |
| alignment_stuffmg | 0x00 | 0x00 | 0x00 | 0x00 |
| splice_insert( ) | | | | |
| splice_event_id | Pass-through $_{note\ 1}$ | | | |
| splice_event_cancel_indicator | 0 | | | |
| out_of_network_indicator | pass-through/if=splice immediate= 1 parse 0/1 | | | |
| program_splice_flag | $1_{binary}$ | | | |
| duration_flag | pass-through | | | |
| splice_immediate_flag | pass-through/0/1 | | | |
| splice_time( ) | varies $_{note\ 2}$ | | | |
| if(duration_flag = '1') | | | | |
| break_duration( ) | pass-through | | | |
| unique_program_id | pass-through | | | |
| avail_num | pass-through | | | |
| avails_expected | pass-through | | | |
| descriptor_loop_length | set accordingly | | | |
| alignment_stuffing | 0x00 | | | |
| Time_signal( ) | | | | |
| Time_specified_flag | | $0/1_{binary}$ | $0/1_{binary}$ | $0/1_{binary}$ |
| Reserved | | set accordingly | set accordingly | set accordingly |
| pts_time | | varies $_{note\ 2}$ | varies $_{note\ 2}$ | varies $_{note\ 2}$ |
| segmentation_descriptor( ) | | | | |
| splice_descriptor_tag | 0x02 | 0x02 | 0x02 | 0x02 |
| descriptor_length | set accordingly | set accordingly | set accordingly | set accordingly |
| Identifier | 0x43554549 | 0x43554549 | 0x43554549 | 0x43554549 |
| segmentation_event_id | Pass-through | Pass-through $_{note\ 4}$ | Pass-through $_{note\ 4}$ | Pass-through $_{note\ 4}$ |
| segmentation_event_cancel_indicator | $0_{binary}$ | $0_{binary}$ | $0_{binary}$ | $0_{binary}$ |
| if(segmentation_event_cancel_indicator = '0') | | | | |
| program_segmentation_flag | 1 | 1 | 1 | 1 |
| segmentation_duration_flag | 1 | 1 | 1 | 1 |
| delivery_not_restricted_flag | Pass-through/0/1 | Pass-through/0/1 | Pass-through/0/1 | Pass-through/0/1 |
| if(delivery_not_restricted_flag ='0') | Pass-through/0/1 | Pass-through/0/1 | Pass-through/0/1 | Pass-through/0/1 |
| web_delivery_allowed_flag | Pass-through/0/1 | Pass-through/0/1 | Pass-through/0/1 | Pass-through/0/1 |
| no_regional_blackout_flag | Pass-through/0/1 | Pass-through/0/1 | Pass-through/0/1 | Pass-through/0/1 |
| archive_allowed_flag | Pass-through/0/1 | Pass-through/0/1 | Pass-through/0/1 | Pass-through/0/1 |
| device_restrictions | Pass-though/0x11 | Pass-though/0x11 | Pass-though/0x11 | Pass-though/0x11 |
| If(segmentation_duration_flag=1) | | | | |
| segmentation_duration | Pass-through | Pass-through | Pass-through | Pass-through |
| segmentation_upid_type | Pass-through/ 0x00 | Pass-through/ 0x00 | Pass-through/ 0x00 | Pass-through/ 0x00 |
| segmentation_upid_length | Pass-through/ 0x00 | Pass-through/ 0x00 | Pass-through/ 0x00 | Pass-through/ 0x00 |
| segmentation_upid( ) | Pass-through/ 0x00 | Pass-through/ 0x00 | Pass-through/ 0x00 | Pass-through/ 0x00 |
| segmentation_type_id | Pass-through/ 0x32/0x33 $_{note\ 3}$ | Pass-through/ 0x30/0x31 $_{note\ 3}$ | Pass-through/ 0x10/0x11 $_{note\ 3}$ | Pass-through/ 0x34/0x35 $_{note\ 3}$ |
| segmentation_num | 0 | 0 | 1 | 0 |
| segments_expected | 0 | 0 | 1 | 0 |

Note 1—The POIM 604 may not output a SCTE-35 message with the 4 MSBs of the splice_event_id==0xF. If the incoming 4 MSBs of the splice_event_id==0xF, then the POIM 604 may output the 4 MSBs of the splice_event_id=0xC.

Note 2—If the time_specified_flag=0 but offset exists the POIM 604 switches to time_specified_flag=1 and inserts appropriate pts_time.

Note 3—the value used may be a function of an out_of_network_indicator of a first AD message.

Note 4—Refer to above-description for the splice_event_id.

The described mapping may include deciphering whether a first AD message is for a local, provider, or national AD and mapping the input fields to the output fields, accordingly. Certain output fields may be set based on corresponding input fields and/or other input fields. For example, a first output field may indicate whether the AD is to be played out is a local AD, a provider AD or a national AD. Other output fields may be set based on the first output field. The mapping standardizes definitions for terms between the different content provider formats and the in-house (or standardized) format, such as the terms "local", "provider" and "national". Content providers use these terms loosely and/or have different meanings for these terms. A first content provider may define local ADs, provider ADs and/or national ADs different than another content provider. A local AD may refer to ADs to be played out for POP devices within a local area or within a local area network. Provider ADs may be content provider or advertiser specific and be provided by the content provider and/or advertiser. National ADs may be broadcasted to a national audience, over a large area, and/or to POP devices within one or more a wide area networks and/or local area networks. The POIM 604 interprets the first AD messages to determine what type (local, provider, national) of AD is meant to be played out based on the first AD messages and sets the fields of the second AD messages accordingly. This is based on prior knowledge of the fields provided by each of the content providers and/or advertisers.

Due to complexity of first AD messages, conflicts may arise while parsing incoming AD messages. The POIM 604 may generate an alarm indicating that a conflict exists, but the POIM 604 may not perform conflict resolution. As an example, Table 5 defines the text "set accordingly" to be used to direct the POIM 604 to set the corresponding field according to contents of the message.

If a first AD message is a local/legacy AD message having a splice_insert( ) with no segmentation descriptor, then the POIM 604 treats this message as described in Table 5. The POIM 604 may not add a segmentation_descriptor to this message. If the first AD messages are local AD messages having a splice_insert( ) with a segmentation descriptor, the POIM 604 treats the local AD messages as described above. National AD messages include a time_signal( ) with segmentation descriptors.

The AD messages disclosed herein may indicate program boundaries including start and end times or frames/packets of programs to support streaming playback. The AD messages may use the time_signal( ) command with segmentation descriptors to indicate start of program, end of program, start of ADs, end of ADs, as well as segments or chapters of the program as defined by ANSI/SCTE-35 2014. Slate insertion messaging may be accomplished with a time_signal( ) message having a segmentation_descriptor in combination with device_not_restricted_flags and associated informational bits. The POIM 604 may process out-of-band XML manifests for verification, altering or insertion of in-band SCTE-35 messages. Insertion refers to the inserting of the second AD messages into a video signal or stream, as performed in the following tasks.

At 712, the POIM 604 transmits the second messages to the divider and combiner module 602. At 714, the divider and combiner module 602 combines the second messages in the in-house format with the video/audio signals (non-streaming content signals) received from the IRD 600. The video/audio signals may be included in a same signal. The second messages are combined with the video/audio signals at a later point in time (or in parallel with frames/packets occurring later in time) than when the corresponding first messages were separated from the video/audio signals. In other words, the divider and combiner module 602 may continue to forward the video/audio signals to the processing modules 606 while the POIM 604 is mapping the first messages (including the in-band data, the IP metadata and/or the out-of-band data) to the second messages. This delay may be accounted for by the content provider 502, one or more of the processing modules 606 (e.g., the iTX module 608) and/or the POP devices 510, such that the programs and ADs are played out at the appropriate times and/or between the appropriate frames/packets of video/programs.

At 716, the iTX module 608 determines based on elements of the second messages when the programs and ADs are to be played out. This may include changing a predetermined number of bits and/or a predetermined number of MSBs of one or more fields (e.g., a splice event ID field) of one or more of the second messages as described above. The bits of the field(s) or an entire event ID may be changed to, for example, 0xFFFFFFFF or the predetermined number of MSBs may each be changed to 0xF. This may occur, for example when a SCTE 104 message with a splice insert type of 0x01 is received during an open AD opportunity window. Other types of SCTE-104 splice insert type messages or time signal messages received outside an AD opportunity window may be dropped or may be permitted to pass-through. Thus, the least significant bits (LSBs) may be passed through to the encoder 610. These changes provide a unique identifier indicating when the ADs are to be inserted.

At 718, the encoder 610 may encode outputs of the iTX module 608. At 720, the break descriptor module 614 (for non-streaming content) or the SPS modules 616 (for streaming content) may determine one or more targeted ADs to be played out based on an output of the iTX module 608. The selected ADs may be indicated in the output signals provided from the processing modules 606, the BDS module 614, and/or the SPS modules 616 to the POP devices 510. The encoder 610 encodes source content or content stored in a content memory prior to being sent to the POP devices 510. The encoder 610 may digitize and compress files. At 722, the multiplexer 612 may multiplex outputs of the encoder 610 and break descriptor module 614.

At 724, non-streaming signals and/or streaming signals are transmitted from the headend 508, the processing modules 606, the BDS module 614, and/or the SPS modules 616 to the POP devices 510. At 726, the POP devices 510 receive the non-streaming signals and/or streaming signals. The POP devices 510 also receive messages (the second messages as modified by the processing modules 606) and/or other messages (third messages) indicating when and which programs and/or ADs to be played out. The third messages may be in the in-house format. The received messages may be received as part of the non-streaming signal or the streamlining signal or may be received as a separate signal. The non-streaming signal and the streaming signal may indicate the targeted programs/ADs to be played out, timing and/or frame/packet placement of the targeted ads, program during which the ADs are to be placed, start time of the program, slate information for content that cannot be streamed, and/or other program and/or AD related information. The other program and/or AD related information may include any of the parameters and/or AD information disclosed herein. The signals may be transmitted from the processing modules 606 and/or transport devices (e.g., transport devices 556, 558 of FIG. 6) via an antenna or the Internet to the POP devices 510. At 728, the POP devices 510 may then access the selected programs and/or ADs stored in memories of the POP devices 510, at the headend 508, and/or stored elsewhere and play out the selected programs and/or ADs at the appropriate times. The method may end at 730.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-disclosed content providers, headends, service providers, advertisers, product and/or service providers, payment service providers and/or backend devices may include and/or be implemented as respective servers. The servers may include respective control modules for performing one or more of the corresponding tasks and/or functions disclosed herein.

The above-disclosed examples provide mapping of different customized provider AD messages to a single format recognizable to various downstream POP devices. This mapping may be performed without out-of-band manifests and/or metadata. Traditionally, out-of-band manifests and metadata were required to create or correct in-band AD messages. The disclosed examples allow a user to re-define incoming program and/or AD messages to a standardized (or in-house) format without the need for out-of-band data. The in-house format can be used by various devices to act upon a request embedded in the messages without need for all of the devices to be individually updated, configured and maintained for various different types of content provider message formats, which may vary from service to service. The disclosed POIMs allow for a single localized device or module to be configured for provider message parsing and manipulation. The POIs aids LiveTV, BDS addressable AD services, iTX operation, and automation and linear systems in addressing AD messages. The POISs and POIMs discloses herein may be SCTE-67 compliant for ease of integration.

The wireless communications described in the present disclosure with respect to Bluetooth transceivers of user receiving devices and mobile devices may include transmission of data and/or signals having short-wavelength ultra-high frequency (UHF) radio waves in an industrial, scientific and medical (ISM) radio frequency band from 2.4 to 2.485 GHz. The signals may be transmitted based on Bluetooth protocols and/or standards. The signals may be transmitted based on Bluetooth low energy (or smart) protocols and/or standards. The Bluetooth transceivers may include respective antennas.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11 ad, and/or draft IEEE standard 802.11 ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii)

object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

A content or service provider is also described herein. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure the transfer of video, programs, or channel information may include and is not limited to the transfer of data, content, information, programs, movie trailers, movies, advertising, assets, video data, etc.

As used herein, the term "title" will be used to refer to, for example, a movie itself and not the name of the movie. While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A content distribution method comprising:
receiving a plurality of in-band signals from respective content providers at a head end, wherein the plurality of in-band signals include video content;
receiving at a placement opportunities information module of the head end a plurality of first messages associated respectively with the content providers, wherein the plurality of first messages are advertisement messages or program messages and have a plurality of respective formats, each of the advertisement messages or program messages having a first splice time parameter;
mapping, at the head end, the plurality of first messages to a plurality of second messages by changing the first splice time parameter to a second splice time parameter, wherein the plurality of second messages have a same format, and wherein the same format is different than the plurality of respective formats of the first messages and is standardized for a plurality of point of presence devices, said plurality of first messages and said plurality of second messages each comprising a playout time;
combining the second messages with the video content to generate combined signals at a combiner module of the headend;
forwarding the combined signals to one or more insertion modules of a headend;
determining, at the one or more insertion modules of the headend, when the second messages are to be played out based on the playout time;
generating output signals at the one or more insertion modules based on the second time parameter and the playout time of the combined signals; and
for each of the output signals, transmitting a non-streaming signal or a streaming signal from the headend to the plurality of point of presence devices.

2. The content distribution method of claim 1, wherein the plurality of first messages are received from the content provider at a divider and separated from the video content at the divider.

3. The content distribution method of claim 1, wherein the plurality of first messages satisfy a society of cable telecommunications engineers (SCTE)-35 message standard.

4. The content distribution method of claim 1, wherein the plurality of second messages satisfy a society of cable telecommunications engineers (SCTE)-35 message standard.

5. The content distribution method of claim 1, wherein the plurality of first messages are received at the headend while the plurality of in-band signals are received at the headend.

6. The content distribution method of claim 5, wherein the plurality of first messages are received on a same channel at the headend as the plurality of in-band signals.

7. The content distribution method of claim 5, wherein the plurality of first messages are received at the headend as out-of-band signals from the content provider.

8. The content distribution method of claim 7, wherein:
the plurality of in-band signals are received via a satellite; and
the out-of-band signals are received at the placement opportunities information module via a terrestrial network.

9. The content distribution method of claim 1, wherein first ones of the point of presence devices are configured for non-streaming video and second ones of the point of presence devices are configured to stream video.

10. The content distribution method of claim 9, wherein:
some of the point of presence devices are of a first type and are configured for streaming video; and
others of the point of presence devices are of a second type and are not configured to streaming video.

11. The content distribution method of claim 1, comprising:
- forwarding the combined signals to processing modules of the headend, wherein the processing modules include one or more information technology extended modules;
- generating the output signals at the one or more information technology extended modules based on the combined signals; and
- for each of the combined signals, transmitting the corresponding non-streaming signal or the corresponding streaming signal from the headend to the point of presence devices based on outputs of the one or more information technology extended modules.

12. The content distribution method of claim 11, further comprising:
- determining at a plurality of processing modules when the advertisements are to be played out at the plurality of point of presence devices;
- determining at the plurality of processing devices or at a plurality of transport devices which advertisements are to be played out at the plurality of point of presence devices; and
- modifying predetermined fields of the plurality of second messages or generating a plurality of third messages to indicate the advertisements to play out and when the advertisements are to be played out.

13. A content distribution system comprising:
- a headend configured to receive a plurality of in-band signals from respective content providers, wherein the plurality of in-band signals include video content;
- a placement opportunities information module configured to
  - receive a plurality of first messages associated respectively with the content providers, wherein the plurality of first messages are advertisement messages or program messages and have a plurality of respective formats, each of the advertisement messages or program messages having a first splice time parameter, and
  - map the plurality of first messages to a plurality of second messages by changing the first splice time parameter to a second splice time parameter, wherein the plurality of second messages have a same format, wherein the same format is different than the plurality of respective formats of the first messages and is standardized for a plurality of point of presence devices, said plurality of first messages and said plurality of second messages each comprising a playout time; and
- a combiner configured to combine the second messages with the video content to generate combined signals at a combiner module of the headend;
- one or more insertion modules configured to receive the combined signals from the combiner, to determine, at the one or more insertion modules of the headend, when the second messages are to be played out based on the playout time, and generate output signals based on the combined signals; and
- wherein the headend is configured to, for each of the output signals, transmit a non-streaming signal or a streaming signal to the plurality of point of presence devices.

14. The content distribution system of claim 13, further comprising a divider configured to separate the plurality of first messages from the video content.

15. The content distribution system of claim 13, wherein the plurality of first messages and the plurality of second messages satisfy a society of cable telecommunications engineers (SCTE)-35 message standard.

16. The content distribution system of claim 13, wherein the plurality of first messages are received at the headend while the plurality of in-band signals are received at the headend.

17. The content distribution system of claim 16, wherein the plurality of first messages are received on a same channel at the headend as the plurality of in-band signals.

18. The content distribution system of claim 16, wherein:
- the plurality of first messages are received at the headend as out-of-band signals from the content provider;
- the plurality of in-band signals are received via a satellite; and
- the out-of-band signals are received at the placement opportunities information module via a terrestrial network.

19. The content distribution system of claim 13, wherein first ones of the point of presence devices are configured for non-streaming video and second ones of the point of presence devices are configured to stream video.

20. The content distribution system of claim 19, wherein:
- some of the point of presence devices are of a first type and are configured for streaming video; and
- others of the point of presence devices are of a second type and are not configured to stream video.

21. The content distribution system of claim 13, further comprising a plurality of processing modules, wherein:
- the combiner is configured to forward the combined signals to the plurality of processing modules;
- the plurality of processing modules include one or more information technology extended modules;
- the one or more information technology extended modules are configured to generate the output signals based on the combined signals; and
- the headend is configured to, for each of the combined signals, transmit the corresponding non-streaming signal or the corresponding streaming signal to the point of presence devices based on outputs of the one or more information technology extended modules.

22. The content distribution system of claim 21, further comprising:
- a plurality of processing modules configured to determine when the advertisements are to be played out at the plurality of point of presence devices; and
- a plurality of transport devices, wherein the plurality of processing modules or the plurality of transport devices are configured to
  - determine which advertisements are to be played out at the plurality of point of presence devices, and
  - modify predetermined fields of the plurality of second messages or generating a plurality of third messages to indicate the advertisements to play out and when the advertisements are to be played out.

* * * * *